US011614733B2

(12) United States Patent
Castillo Castillo et al.

(10) Patent No.: US 11,614,733 B2
(45) Date of Patent: Mar. 28, 2023

(54) COMPUTER SYSTEM AND METHOD FOR AUTOMATED BATCH DATA ALIGNMENT IN BATCH PROCESS MODELING, MONITORING AND CONTROL

(71) Applicant: AspenTech Corporation, Bedford, MA (US)

(72) Inventors: Pedro Alejandro Castillo Castillo, Houston, TX (US); Hong Zhao, Sugar Land, TX (US); Mark-John Bruwer, Richmond, TX (US); Ashok Rao, Sugar Land, TX (US)

(73) Assignee: AspenTech Corporation, Bedford, MA (US)

( * ) Notice: Subject to any disclaimer, the term of this patent is extended or adjusted under 35 U.S.C. 154(b) by 1368 days.

(21) Appl. No.: 15/967,099

(22) Filed: Apr. 30, 2018

(65) Prior Publication Data

US 2019/0332101 A1    Oct. 31, 2019

(51) Int. Cl.
*G05B 23/02* (2006.01)
*G05B 13/04* (2006.01)
(Continued)

(52) U.S. Cl.
CPC ....... *G05B 23/0254* (2013.01); *G05B 13/047* (2013.01); *G05B 13/048* (2013.01);
(Continued)

(58) Field of Classification Search
None
See application file for complete search history.

(56) References Cited

U.S. PATENT DOCUMENTS 7,793,292 B2 * 9/2010 Worek ............... G05B 19/4183
715/740
10,133,268 B2 * 11/2018 Bokis ................. G05B 23/0294
(Continued)

FOREIGN PATENT DOCUMENTS

WO   20110146914 A2   11/2011
WO   2022026114 A1    2/2022

OTHER PUBLICATIONS

Kassidas et al., "Synchronization of Batch Trajectories Using Dynamic Time Warping", Apr. 1998, AIChE Journal vol. 44 No. 4, pp. 2-3 (Year: 1998).*
(Continued)

*Primary Examiner* — Mohammad Ali
*Assistant Examiner* — David Earl Ogg
(74) *Attorney, Agent, or Firm* — Hamilton, Brook, Smith & Reynolds, P.C.

(57) ABSTRACT

Embodiments include a computer-implemented method (and system) for performing automated batch data alignment for modeling, monitoring, and control of an industrial batch process. The method (and system) loads, scales, and screens plant historian batch data for an industrial batch process. The method (and system) selects a reference batch as basis of the batch alignment, defines and adds or modifies one or more batch phases, and selects one or more batch variables based on one or more profiles and corresponding curvatures of the batch data. The method (and system) estimates one or more weightings, adjust one or more tuning parameters and uses a sliding time window combined with DTW, DTI and GSS algorithms, performs the batch alignment in offline mode or online mode.

19 Claims, 22 Drawing Sheets

(51) Int. Cl.
    *G05B 19/418* (2006.01)
    *G06K 9/62* (2022.01)
(52) U.S. Cl.
    CPC ..... *G05B 19/41865* (2013.01); *G05B 23/024*
        (2013.01); *G06K 9/6223* (2013.01); *G05B*
        *2219/32077* (2013.01)

(56) References Cited

U.S. PATENT DOCUMENTS

| | | | | |
|---|---|---|---|---|
| 2004/0243380 | A1* | 12/2004 | Blevins | G05B 13/027 703/22 |
| 2009/0287320 | A1* | 11/2009 | MacGregor | G05B 17/02 700/29 |
| 2010/0057237 | A1* | 3/2010 | Kettaneh | G05B 19/41885 700/103 |
| 2011/0288660 | A1* | 11/2011 | Wojsznis | G05B 19/41875 700/30 |
| 2011/0288837 | A1* | 11/2011 | Blevins | G05B 17/02 703/6 |
| 2014/0214372 | A1* | 7/2014 | Haas | G06F 30/20 703/2 |
| 2020/0057958 | A1 | 2/2020 | Moore et al. | |
| 2020/0150601 | A1 | 5/2020 | Valpola | |
| 2022/0035348 | A1 | 2/2022 | Ma et al. | |

OTHER PUBLICATIONS

Qin et al., "Multiblock Principal Component Analysis Based on a Combined Index for Semiconductor Fault Detection and Diagnosis", May 2006, IEEE Transactions on Semiconductor Manufacturing vol. 19 No. 2, pp. 159-160 (Year: 2006).*
International Search Report and the Written Opinion of the International Searching Authority, or the Declaration for International Application No. PCT/US2019/023160, entitled; "Computer System And Method For Automated Batch Data Alignment In Batch Process Modeling, Monitoring And Control", dated Jun. 24, 2019.
Toru Kashima, "Average trajectory calculation for bath processes using Dynamic Time Warping", Sice Annual Conference, Proceedings of, IEEE, Aug. 18, 2010, pp. 2939-2941.
Paul Nomikos, John F. MacGregor, "Monitoring Batch Processes Using Multiway Principal Component Analysis, AIChE Journal," 40(8), 1361-1375 (Aug. 1994).
González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (Jan. 2011).
Dai, C., Wang, K., & Jin, R., "Monitoring Profile Trajectories with Dynamic Time Warping Alignment," Quality and Reliability Engineering International, 30(6), 815-827 (Jun. 2014).
González Martínez, J. M., De Noord, O., & Ferrer, A. "Multi-synchro: a novel approach for batch synchronization in scenarios of multiple asynchronisms," Journal of Chemometrics, 28(5):462-475 (Oct. 2014).
Ramaker, H. J., van Sprang, E. N., Westerhuis, J. A., & Smilde, A. K., "Dynamic time warping of spectroscopic BATCH data," Analytica Chimica Acta, 498(1), 133-153 (Aug. 2003).
Zhang, Y., & Edgar, T. F., "A Robust Dynamic Time Warping Algorithm for Batch Trajectory Synchronization," American Control Conference, pp. 2864-2869 (Jun. 2008).
Kiefer, J., "Sequential Minimax Search for a Maximum," Proceedings of the American Mathematical Society, 4(3), 502-506 (1953).
Keogh, E., Chu, S., Hart, D., & Pazzani, M. "Segmenting Time Series: A Survey and Novel Approach," In M. Last, A. Kandel & H. Bunke (Eds.), Data mining in time series databases (pp. 1-15), Singapore: World Scientific Publishing (2004).
Guo, Y., et al., "Discriminative Batch Mode Active Learning," Proceeding NIPS'07 Proceedings of the 20th International Conference on Neural Information Processing Systems, pp. 593-600 (Dec. 2007).
Tong, S., et al., "Support Vector Machine Active Learning with Applications to Text Classification," Journal of Machine Learning Research, pp. 45-66 (2001).
International Search Report and Writtien Opinion of PCT/US2021/040070 dated Oct. 18, 2021, titled "Computer System and Method for Batch Data Alignment with Active Learning In Batch Process Modeling, Monitoring, And Control".
Fransson M et al: "Real-time alignment of batch process data using COW for on-line process monitoring", Chemometrics and Intelligent Laboratory Systems, Elsevier Science Publishers B.V. Amsterdam, NL, vol. 84, No. 1-2, Dec. 1, 2006.
International Preliminary Report on Patentability, issued in PCT/US2019/023160, entitled "Computer System and Method for Automated Batch Data Alignment in Batch Process Modeling, Monitoring and Control," 11 pages, dated Nov. 12, 2020.

* cited by examiner

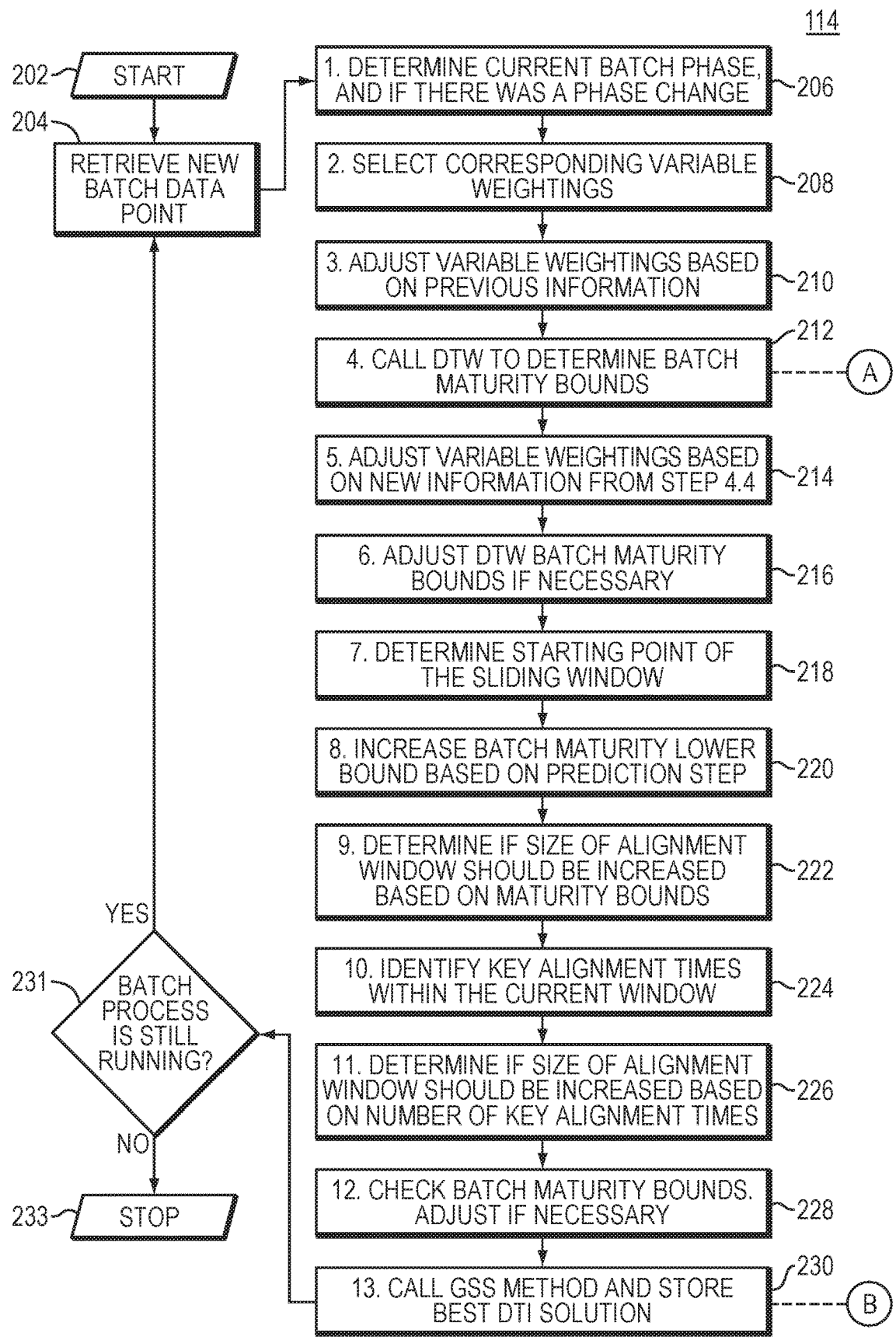
FIG. 1G-I

FIG. 1G-II

COMPUTER SYSTEM AND METHOD FOR AUTOMATED BATCH DATA ALIGNMENT IN BATCH PROCESS MODELING, MONITORING AND CONTROL

BACKGROUND

In the process industry, advanced process control (e.g. Multivariable Predictive Control, or MPC) and real-time optimization (RT-OPT) have been progressing and applied in practice over the last three decades. Thousands of MPC systems are running in refineries, chemical plants, petrochemical processing units and other manufacturers to maintain the safe operations of their processes while maximizing their margins. However, most of the successes mentioned above are concentrated in continuous manufacturing processes. In another type of important production process often seen in the process industry—batch processes, state of the art, however, is quite behind. Many batch processes are still running with conventional proportional-integral-derivative (PID) control or manual control in some cases.

Batch processes play an important role in several industries such as pharmaceutical, biochemical, and food or biological, among others. Therefore, developing and deploying advanced modeling, monitoring and control systems in batch production processes is desirable and very beneficial to many manufacturers, particularly for those in the special chemicals and pharmaceutical industries, in addition to those in the traditional energy and petro-chemical industries.

SUMMARY

A batch process is a process with a start time and end time point and some evolution of variables in between. Typical batch process examples are often seen in the manufacturing industry of special chemicals, pharmaceuticals, blending and mixing, polymer processing, semi-conductor manufacturing, processing of food products, and such. Different from continuous processes, batch production processes have many special characteristics which made the existing approaches so widely used in continuous processes, such as MPC and RT-OPT technology, not suitable to apply. Instead, a set of special modeling and control technology for batch processes is required. First-principle model based batch monitoring and control technology is still under development because the physical, chemical and biological mechanisms involved in many batch production processes are still unclear, such as in biochemical fermentation processes, polymerization processes, etc. It is still difficult to build accurate first-principle models for most bio-chemical batch processes in the pharmaceutical industry and in many physical and chemical batch processes in the special chemicals industries.

Comparably, data-driven approaches using multivariate statistical models built on historical batch data have become more attractive and are showing usefulness in practice. Although many academic case studies and papers are published and employ the most often-seen existing approaches, including building and using Principal Component Analysis (PCA) and Projection to Latent Structure (PLS) multivariate statistical models to monitor and control batch processes (see Paul Nomikos, John F. MacGregor, "Monitoring Batch Processes Using Multiway Principal Component Analysis, AIChE Journal," 40(8), 1361-1375 (August 1994)), the efforts of those academic studies are still at developing and improving mathematical algorithms and focus on simulated and small pilot problems. For industrial practice, systematic solutions are still lacking. This disclosure is an important advanced step toward such an industrial systematic solution.

More specifically, one basic problem in data-driven batch modeling is that the length of each batch completion over time may be inconsistent, which makese the "batch data alignment" an important and necessary step for implementation of any data-driven batch modeling, monitoring and control strategy. Although academic research and case studies on batch data alignment problems are reported (see González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5): 462-475 (October 2014); Ramaker, H. J., van Sprang, E. N., Westerhuis, J. A., & Smilde, A. K., "Dynamic time warping of spectroscopic BATCH data," Analytica Chimica Acta, 498(1), 133-153 (August 2003); Zhang, Y., & Edgar, T. F., "A Robust Dynamic Time Warping Algorithm for Batch Trajectory Synchronization," American Control Conference, pp. 2864-2869 (June 2008)), in those existing approaches the proposed approaches were based on Dynamic Time Warping (DTW) algorithm. It is known that the DTW approach may result in undesirable alignment results in some cases (Zhang, Y., & Edgar, T. F., "A Robust Dynamic Time Warping Algorithm for Batch Trajectory Synchronization," American Control Conference, pp. 2864-2869 (June 2008)), and it is not matured enough for industrial practice.

More importantly, a systematic method able to handle many practical issues, for both offline and online batch alignments in industrial applications, is lacking in the existing approaches.

This disclosure describes a comprehensive method (and system) that addresses many steps in details of the batch data alignment and automated workflow suitable for both offline batch data alignment for modeling and online batch data alignment for process monitoring and control. Aspects of the present invention provide an approach for modeling for real-time applications.

A new computer method (and system) is disclosed for an automatic way to perform offline and online batch data alignment starting with historical batch data. The system itself is capable of performing the following major tasks: (1) load available historical batch data; (2) Scale, screen, identify and exclude outlier batches from historical batch data; (3) Select an optimal reference batch based on various measures for alignment; (4) Assist user to define and calculate batch phases; (5) Select key variables to join alignment procedure; (6) Estimate variable weighting coefficients for optimal alignment; (7) perform batch alignment in an offline mode, online mode, or in both offline and online modes.

In step (7) above, the disclosed system may perform batch alignment for both offline and online applications. In the offline case, batch data may be available from a plant historian, and the major applications are batch modeling and analysis on past batch operation data, such as product quality analysis on batch feed components, recipes comparison, operational procedure optimization and operation problem diagnosis, etc.

In an online case, the batch alignment is performed on the current running batch against a selected reference batch, and the applications may be for monitoring the progress of the underline batch process and predicting the end product quality, etc. In online cases, it is performed repeatedly with a sliding time window because partial batch data is available when the batch is still running.

The system provides an improved solution over standard Dynamic Time Warping (DTW) approaches (see González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5):462-475 (October 2014); Ramaker, H. J., van Sprang, E. N., Westerhuis, J. A., & Smilde, A. K., "Dynamic time warping of spectroscopic BATCH data," Analytica Chimica Acta, 498 (1), 133-153 (August 2003); Zhang, Y., & Edgar, T. F., "A Robust Dynamic Time Warping Algorithm for Batch Trajectory Synchronization," American Control Conference, pp. 2864-2869 (June 2008)) in existing approaches. The disclosed system for both offline and online alignment used a so-called Dynamic Time Interpolation (DTI) algorithm with a sliding time window to solve the batch alignment problem and results in smooth results that are more suitable and desirable than those DTW solutions in existing approaches for industrial applications. Different from the DTW algorithms, in the disclosed approach, the batch alignment problem is defined and formulated as a continuous optimization problem to solve, and the results are continuous in time and always smooth.

Specifically, in real-time (online) cases, at a time point during a batch, partial (past) batch data is available. The problem to be solved is a repeated minimization with time-varying conditions over time. Because the current batch to be aligned is an on-going process and the reference batch is a completed batch, the system needs to determine which phase the current batch is at and what the current batch maturity is. Furthermore, variations (profiles) of process variables may be different at each batch phase; therefore, their weightings in a batch alignment problem may change accordingly. These factors may make an online batch alignment problem more complicated, and the solution time is also increased. To reduce the total online alignment calculation time, a sliding window is introduced, and a modified online minimization of DTW and DTI with a Golden Section Search (GSS) procedure is used in the disclosed system.

In more detail, in some embodiments, the system can perform the following specific steps to achieve the optimal alignment at any time point during a batch progressing:

(1) Determine the current batch phase;
(2) Select a set of corresponding variable weightings;
(3) Adjust variable weightings based on available information so far during the batch;
(4) Apply DTW algorithm to estimate batch maturity;
(5) Further adjust variable weightings based on the estimated maturity;
(6) Adjust batch maturity bounds;
(7) Determine starting point of a sliding window;
(8) Compute prediction step;
(9) Increase sliding window size and re-adjust batch maturity bounds when necessary;
(10) Identify key alignment times;
(11) Apply DTW algorithm to determine the relative position of the key alignment times in the final alignment;
(12) Apply DTI with GSS algorithm to fine tuning and finalize current alignment; and
(13) Provide online application engine (e.g. PCA, PLS models) with the current alignment results and wait for next sampling/calculation cycle.

Example embodiments of the present invention are directed to computer-implemented methods, computer systems, and computer program products that model, monitor, and control an industrial batch process. The computer systems comprise a processor and a memory with computer code instructions stored thereon. The memory is operatively coupled to the processor such that, when executed by the processor, the computer code instructions cause the computer system to implement a modeler engine. The computer program products comprise a non-transitory computer-readable storage medium having code instructions stored thereon. The storage medium is operatively coupled to a processor, such that, when executed by the processor, the computer code instructions cause the processor to model, monitor, and control an industrial batch process.

In some embodiments, the computer methods, systems (via the analysis engine), and program products load batch data from a plant historian database for a subject industrial batch process. In some embodiments, the computer methods, systems, and program products scale the loaded batch data for batch alignment. In some embodiments, the computer methods, systems, and program products screen and remove outliers of batch data from the scaled batch data. In some embodiments, the computer methods, systems, and program products select a reference batch as basis of the batch alignment from the screened batch data. In some embodiments, the computer methods, systems, and program products define and add or modify one or more batch phases associated with the screened batch data for the batch alignment. In some embodiments, the computer methods, systems, and program products select one or more batch variables associated with the screened batch data based on at least one of: (i) one or more profiles of the one or more batch variables and (ii) one or more curvatures of the one or more batch variables. In some embodiments, the computer methods, systems, and program products estimate one or more variable weightings based upon the selected batch variables associated with the batch alignment. In some embodiments, the computer methods, systems, and program products select a given batch of the screened batch data to perform the batch alignment against the reference batch. In some embodiments, the computer methods, systems, and program products adjust one or more tuning parameters associated with the batch alignment. In some embodiments, the computer methods, systems, and program products perform the batch alignment in an offline mode or an online mode. In some embodiments, the computer methods, systems, and program products perform the batch alignment in at least one of an offline mode and an online mode.

In example embodiments, the computer methods, systems, and program products may further screen and remove the outliers of the batch data. As such, the computer methods, systems, and program products may further screen measurements of the selected batch variables for irregular behaviors as compared to behaviors associated with other batches of the screened batch data. The computer methods, systems, and program products may repair data of the screened batch data associated with the irregular behaviors. The computer methods, systems, and program products may remove one or more invalid batches from the screened batch data after the data repair, including batches that include different variation profiles as compared to the other batches over a time interval. The computer methods, systems, and program products may resample the selected batch variables with a base sampling rate. The computer methods, systems, and program products may export the selected given batch.

In example embodiments, the computer methods, systems, and program products may further select the reference batch. As such, the computer methods, systems, and program products may further select a plurality of reference batches from the screened batch data, and for the plurality of further selected reference batches, calculate quantitative statistical measures for each batch of the plurality as compared with average values of the plurality. The computer methods, systems, and program products may display one or more of the plurality of further selected reference batches together to a user with variable profiles in a given view, along with a timeline that represents progression in time of each batch of the plurality. The computer methods, systems, and program products may enable a user to select a subset of batches of the screened batch data for the batch alignment based on the given view and domain knowledge of the user. The computer methods, systems, and program products may enable the user to discard at least one of the selected batch variables to join the batch alignment.

The computer methods, systems, and program products may select the one or more batch variables. The computer methods, systems, and program products may discard at least one of the one or more batch variables having flat trajectories or trajectories inconsistent with each other. The computer methods, systems, and program products may select a subset of batches from the one or more batch variables. In some embodiments, the computer methods, systems, and program products may group the correlated variables. As such, the computer methods, systems, and program products may build a principal component analysis (PCA) model based on unfolding of the screened batch data. The computer methods, systems, and program products may apply K-means clustering to one or more loadings of the principal component analysis (PCA) model. The computer methods, systems, and program products may identify trajectory shapes of the one or more batch variables for a given phase associated with each of the one or more batch variables. The computer methods, systems, and program products may calculate a smoothness index for at least one of the one or more batch variables and the given phase. The computer methods, systems, and program products may calculate a curvature index for the at least one of the one or more batch variables and the given phase. The computer methods, systems, and program products may calculate a consistency index for the at least one of the one or more batch variables and the given phase. The computer methods, systems, and program products may determine an alignment score associated with at least one of the one or more batch variables and the given phase. The computer methods, systems, and program products may display one or more of the following to the user: the discarded batch variables, the selected subset of batches, the grouped correlated variables, the identified trajectory shapes, the calculated smoothness index, the calculated curvature index, the calculated consistency index, and the determined alignment score. The computer methods, systems, and program products may provide the user with one or more suggestions to further select any of the at least one of the one or more batch variables and the given phase.

In some embodiments, the computer methods, systems, and program products may further estimate the one or more variable weightings (weighting coefficients). As such, the computer methods, systems, and program products may pre-calculate weighting coefficients of one or more default variables of the selected batch variables according to a trajectory shape associated with the one or more default variables. The computer methods, systems, and program products may adjust at least one of the one or more weightings based on a rank and standard deviation of at least one of the selected batch variables. The computer methods, systems, and program products may multiply the one or more weightings with a corresponding consistency index. The computer methods, systems, and program products may further adjust the one or more weightings in an iterative manner.

The computer methods, systems, and program products may perform the batch alignment in the online mode. As such, the computer methods, systems, and program products may determine a phase of a current batch of the subject industrial batch process for alignment. The computer methods, systems, and program products may select the one or more estimated variable weightings associated with the current batch phase. The computer methods, systems, and program products may adjust the one or more estimated variable weightings associated with dynamic time warping (DTW) based on information from a previous sequential alignment point of the subject industrial batch process. The computer methods, systems, and program products may estimate a current batch maturity of the subject industrial batch process based on the dynamic time warping (DTW). The computer methods, systems, and program products may adjust the one or more estimated variable weightings based on the current batch maturity estimation from the dynamic time warping (DTW).

The computer methods, systems, and program products may adjust one or more the dynamic time warping (DTW) batch maturity bounds based on the current batch maturity estimation. The computer methods, systems, and program products may modify a starting point of a sliding window associated with the subject industrial batch process. The computer methods, systems, and program products may calculate a prediction and detect a change in trajectory shapes of the selected batch variables. The computer methods, systems, and program products may increase a size of the sliding window based upon a proximity of a lower bound of the dynamic time warping (DTW) solution to a starting point of the sliding window. The computer methods, systems, and program products may identify one or more alignment times (e.g., key alignment times). The computer methods, systems, and program products may check the size of the sliding window for an increase based upon the identified alignment times (e.g., key alignment times). The computer methods, systems, and program products may further adjust the one or more batch maturity bounds based on the current alignment window size. The computer methods, systems, and program products may perform the alignment of the current batch. The computer methods, systems, and program products may repeat steps above of adjusting the variable weightings through the performing of the alignment of the current batch.

In some embodiments, the computer methods, systems, and program products may define batch alignment as a free-end-point problem with a cumulative distance. The computer methods, systems, and program products may generate a grid based upon the defined batch alignment, a number of data points of the current batch, and a number of data points of the reference batch. The computer methods, systems, and program products may determine a warping path associated with the generated grid by traversing the generated grid in a monotonic fashion.

In some embodiments of the computer methods, systems, and program products, the sliding window alignment may be based upon dynamic time interpolation (DTI).

In some embodiments of the computer methods, systems, and program products, the sliding window alignment may be based upon dynamic time interpolation (DTI) with a modified Golden Section Search (GSS).

The computer methods, systems, and program products may define the sliding window alignment based on an objective function that includes a linearly interpolated value.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
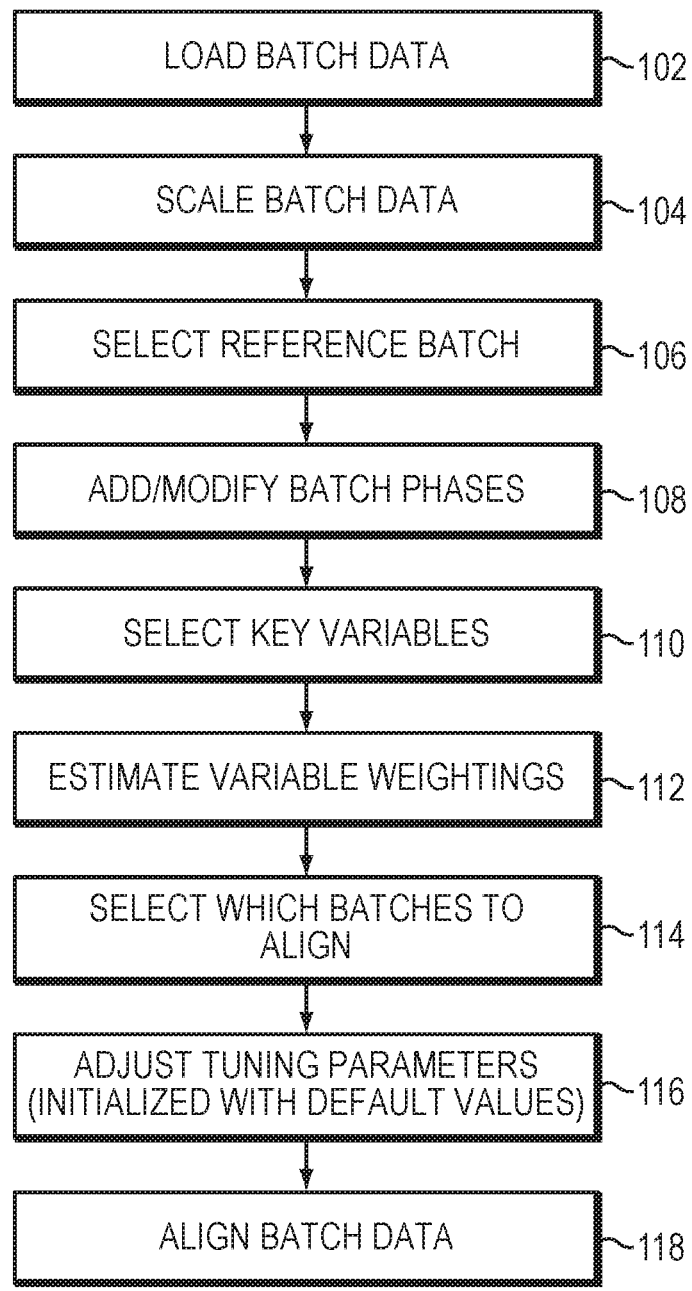
FIG. 1A is a flowchart of an example method for performing batch alignment.

A description of example embodiments follows.

In the process industry, batch processes play an important role in several sectors such as the pharmaceutical, biochemical, food and biological sectors, among others. The development of analysis and monitoring schemes for these kinds of processes is an important task from an economical point of view. In recent years, there has been a trend in business that more and more manufacturers have shifted their concentration from large-volume, low-margin continuous bulky productions to small-volume, but high margin batch productions of special chemicals and pharmaceutical products.

Compared to continuous production processes, however, the technology of modeling, monitoring, and control for batch processes is far behind in practice—most batch processes are operated with conventional PID control or manual control. Advanced batch modeling, monitoring and control based on multivariate statistical approaches using principal component analysis (PCA) and projection to latent structure (PLS) are proposed and case studied in academic research (Paul Nomikos, John F. MacGregor, "Monitoring Batch Processes Using Multiway Principal Component Analysis, AIChE Journal," 40(8), 1361-1375 (August 1994); and González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011)). In some of the existing approaches, several batch alignment algorithms based on DTW algorithm were proposed for online applications. See González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5):462-475 (October 2014); Ramaker, H. J., van Sprang, E. N., Westerhuis, J. A., & Smilde, A. K., "Dynamic time warping of spectroscopic BATCH data," Analytica Chimica Acta, 498(1), 133-153 (August 2003); Zhang, Y., & Edgar, T. F., "A Robust Dynamic Time Warping Algorithm for Batch Trajectory Synchronization," American Control Conference, pp. 2864-2869 (June 2008). However, DTW based approaches show some undesirable characteristics, such as unsmooth alignment and missing key points etc., that are not ideal for industrial applications.

For industrial application practice, batch alignment is a critical step to the success of batch modeling, monitoring, and control. Some of the existing approaches seen from commercial software products for industrial practices, however, have used extremely simple approaches to do batch alignment, and lack accurate and systematic methods and solutions. Some embodiments of the present invention provide users with such an innovative solution to address many important issues in practice, with a complete, automated, and systematic solution for batch offline and online alignment.

The basic problem to solve in multivariate batch modeling and control is that the length of each batch completion over time may be inconsistent, which makes it difficult to compare each batch to a reference batch. Therefore, "batch data alignment" becomes an important and necessary step. Compared with existing approaches (see González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5):462-475 (October 2014); Ramaker, H. J., van Sprang, E. N., Westerhuis, J. A., & Smilde, A. K., "Dynamic time warping of spectroscopic BATCH data," Analytica Chimica Acta, 498(1), 133-153 (August 2003); Zhang, Y., & Edgar, T. F., "A Robust Dynamic Time Warping Algorithm for Batch Trajectory Synchronization," American Control Conference, pp. 2864-2869 (June 2008)), aspects of the Applicant's disclosure address the following advantages over existing approaches:

A systematic method for online batch alignment in industrial implementation is lacking in the existing approaches; this disclosure describes a method (and system) 100 for performing the batch data alignment with an automated workflow for both offline and online batch modeling, monitoring and control;

A system-automated historical batch data loading, screenings and excluding outlier batches and flat trajectory variables, and ability to identify valid batches and rank key batch variables; these methods are lacking in existing approaches.

Some existing approaches (see González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5):462-475 (October 2014); Ramaker, H. J., van Sprang, E. N., Westerhuis, J. A., & Smilde, A. K., "Dynamic time warping of spectroscopic BATCH data," Analytica Chimica Acta, 498(1), 133-153 (August 2003); Zhang, Y., & Edgar, T. F., "A Robust Dynamic Time Warping Algorithm for Batch Trajectory Synchronization," American Control Conference, pp. 2864-2869 (June 2008)) used a so called Dynamic Time Warping (DTW) algorithm to perform the batch data alignment, however, DTW can introduce significant distortions in the aligned data (e.g., some stair-step behavior not present in the original raw data may be introduced) and it can also skip over abnormalities in the trajectory data due to its discrete-time nature (Zhang, Y., & Edgar, T. F., "A Robust Dynamic Time Warping Algorithm for Batch Trajectory Synchronization," American Control Conference, pp. 2864-2869 (June 2008)). In this disclosure, an alternative algorithm, so-called dynamic time interpolation (DTI), is defined and works together with the DTW algorithm to address this issue.

For online batch monitoring and control applications, when doing the alignment online, the measured batch trajectory is not complete. Thus, it is necessary to first determine the current batch maturity and then perform the alignment accordingly. Existing approaches used DTW with relaxed (free) endpoint (González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5):462-475 (October 2014)) to determine batch maturity, which may introduce significant distortions. The disclosed system employs DTI with a modified Golden Section Search (GSS), to address this problem.

This disclosure presents an innovative algorithm that resolves the online alignment for the need of industrial practices: it introduces and employs a moving alignment window, which significantly reduces the size of the optimization problem to be solved, and therefore facilitates the online performance at each sampling interval. The new algorithm uses DTW to compute tight batch maturity bounds and reduces the search space for the GSS method. By combing DTI with GSS and DTW together, a satisfied solution for online batch alignment is obtained.

In summary, aspects of the disclosed method (and system) provide batch process operators with a unique and systematic solution to perform the batch alignment offline and online for batch model development, online monitoring and control.

Reference is now made to the figures and particular embodiments for purposes of clarity in illustration and not limitation.

A new computer method (and system) is disclosed for batch data alignment offline and online based on historical batch data. The method (and system) loads historical batch data from a data historian server, automatically screens batch data, and identifies and discards outlier batches and batch variable with flat trajectories, helps users selects candidate reference batches, ranks batch key variables based on calculation and analysis on curvature, consistency, and smoothness, and performs batch alignment. For both offline and online cases, a sliding window is used to facilitate the complex and time-consuming alignment optimization problem (DTI). A detailed solution at each time point of a running batch is provided, and technical strategies to address many practical issues in industrial application are disclosed.

Aspects of the present invention relate to a computer method (and system) to perform batch data alignment either offline for batch modeling and analysis or online for one or more batch processes monitoring and quality control needs. The system is capable of loading and receiving one or more batch variable measurements. The system is capable of performing batch modeling and analysis including but not limited to including performing automated batch data cleansing, reference batch selection; batch phase identification, and both online and offline batch alignment. For online batch monitoring and control applications, the system automatically determines current batch maturity and adapts corresponding in variable weightings and other parameters. The system may perform online batch alignment via a sliding window to speed up the solution search and provide a user with feasible and accurate real-time solutions for batch monitoring and control.

According to some embodiments, the present invention provides a computer method (and system) for performing automated batch data alignment for modeling, monitoring, and control of an industrial batch process. The method (and system) may include loading batch operation data from a plant historian database for a subject industrial batch process. The method (and system) may include scaling loaded batch data for batch alignment. The method (and system) may include screening and removing outlier (outlying) batch data from the loaded original raw batch data. The method (and system) may include selecting a reference batch as the basis of the batch alignment. The method (and system) may include defining and adding/modifying batch phases for alignment. The method (and system) may include selecting key variables based on batch variables' profiles and their curvatures. The method (and system) may include estimating batch variables' weightings in batch alignment. The method (and system) may include selecting a batch to perform alignment against the reference batch. The method (and system) may include adjusting tuning parameters for optimal batch alignment. The method (and system) may include performing a batch alignment in either offline mode or online mode.

According to some embodiments of the method (and system), screening and removing outliers batch data that are unsuitable for batch data alignment comprises one or more of the steps of:
 a) screening batch variables' measurements for significant "irregular" behaviors compared to other batches, including but not limited to large gaps (missing data), measurement outliers, sensor failures, etc.;
 b) applying a data-repair algorithm trying to repair the data;
 c) removing invalid batches after data repair, such as those batches contains significant different variation profiles compared to other batches over the batch time;
 d) resampling selected batch variables with a base sampling rate in the batch process, such as one measurement sample per minute; and
 e) exporting selected and pre-processed batch dataset for further analysis in batch alignment offline and online.

According to some embodiments of the method (and system), selecting reference batch comprises one or more of the steps of:
 a) calculating quantitative statistical measures for each batch vs. average values of selected batches;
 b) displaying those selected batches together to user with per variable profiles per view, along the time line of the batch progressing;
 c) promoting user to select a subset of batches (between 10 and 30) for the batch alignment based on their view combined with his/her domain-knowledge; and
 d) allowing users to discard one or more batch variables to join the batch alignment, typically some variables with flat trajectories that offers less information for batch alignment.

According to some embodiments of the method (and system), selecting key variables comprises one or more of the steps of:
 a) discarding variables with flat trajectories or very inconsistent trajectories;
 b) selecting a subset of batches;
 c) grouping highly correlated variables;
 d) identifying variables trajectory shapes for each phase;
 e) calculating smoothness index for each variable and each phase;
 f) calculating curvature index for each variable and each batch phase;
 g) calculating consistency index for each variable and each batch phase;
 h) determining alignment scores for each variable and each batch phase;
 i) showing above variable characteristics to user for user's input; and
 j) assisting users with suggestions to select key variables for each batch phase.

According to some embodiments of the method (and system), estimating batch variables' weightings comprises one or more of the steps of:
 a) pre-calculating default variables weighting coefficients according to its trajectory shape;
 b) adjusting weightings based on variable's rank and standard deviation;
 c) multiplying weightings with corresponding consistency index; and
 d) further adjusting variable weightings in a "trial and error" manner (e.g., iterative manner) by running several known good batches.

According to some embodiments of the method (and system), performing real-time (online) batch alignment further comprises one or more of the steps of:
 a) determining current batch phase of the running batch to be aligned;
 b) selecting corresponding variable weightings to the current batch phase;
 c) adjusting variable weightings for DTW based on information from previous sequential alignment point;
 d) estimating current batch maturity with DTW;
 e) adjusting variable weighting for DTI based on maturity estimation results from DTW;
 f) adjusting DTW batch maturity bounds based on maturity estimation results;
 g) modifying starting point of sliding window;
 h) calculating prediction step to detect if there is sharp changes in variable trajectory;
 i) increasing sliding window size conditionally when lower bound from DTW is too close to starting point of current sliding window;
 j) identifying key alignment times;
 k) checking the sliding window size for an increase conditionally with the key alignment times;
 l) putting batch maturity bounds in terms of current alignment window size and doing a final check;
 m) calling GSS for an optimal batch maturity estimation with DTI and completing the current point batch alignment; and
 n) repeating steps (a) to (m) at each running time points of the current batch.

According to some embodiments of the method (and system), using DTW to formulate the batch maturity estimation as a free-end-point problem further comprises one or more of the steps of:
  a) defining the batch maturity estimation as a free-end-point problem with cumulative distance Di,j as $$D_{i,j} = \begin{cases} \min \begin{bmatrix} D_{i-1,j} + v_v d_{i,j} \\ D_{i-1,j-1} + v_d d_{i,j} \\ D_{i,j-1} + v_h d_{i,j} \end{bmatrix} & \forall (i, j) \text{ except } (1, 1) \\ d_{i,j} & \forall (i, j) = (1, 1) \end{cases}$$

Where $d_{i,j} = \alpha \Sigma_{k=1}^{K} w_k (yRef_{k,j} - yRaw_{k,i})^2 + (1-\alpha) \Sigma_{k=1}^{K} w_k (\Delta yRef_{k,j} - \Delta yRaw_{k,i})^2$ b) Filling out a grid of size I×J (where I is the number of points of the current batch, and J is the number of points of the entire reference batch) with the cumulative distances associated with each pair of points (i,j); and
  c) Finding the optimal warping path on the grid by backtracking from point to point following the lowest values in the grid in a monotonic fashion.

According to some embodiments of the method (and system), using DTI to formulate sliding-window based alignment problem further comprises one or more of the steps of:
  a) defining the sliding-window based alignment problem as a minimization of $$\min_{\Delta t_j} D = \frac{\alpha}{J} \sum_{k=1}^{K} \sum_{j=1}^{J} w_k (yRef_{k,j} - yInt_{k,j})^2 +$$

$$\frac{(1-\alpha)}{J} \sum_{k=1}^{K} \sum_{j=1}^{J} w_k (\Delta yRef_{k,j} - \Delta yInt_{k,j})^2 +$$

$$\frac{\beta}{RawBatchDuration} \sum_{j=1}^{J-2} (\Delta(\Delta t_j) - \Delta(\Delta t_{j-1}))^2$$

subject to:

$$\sum_{j=1}^{J-1} \Delta t_j = RawBatchDuration$$

$$\Delta t^L \leq \Delta t_j \leq \Delta t^U \quad \forall j = 1, \ldots, J-1$$

Where $yInt_{k,j}$ is a linearly interpolated value computed using eq. (6):

$$yInt_{k,j} = \begin{cases} interp\left(t_{Raw}, y_{Raw}, \sum_{i=1}^{j-1} \Delta t_i\right) & \forall j \geq 2 \\ yRaw_{k,j} & \forall j = 1 \end{cases}$$

According to some embodiments of the method (and system), grouping highly correlated variables further comprises one or more of the steps of:
  a) Building a PCA model using an observation-wise unfolding of the batch data.
  b) Applying K-means clustering to the PCA scores.

According to some embodiments, the method (and system) of performing batch alignment includes one or more of the following steps:

1) The system loads available historical batch data from a database server;
  a) Typically, each batch contains many process variables, each variable is measured with online sensors and recorded at a specific sampling rate depending on the type of each variable, such as mass flow, temperature, and pressure, etc.;
  b) The batch process variables data are not limited to continuous type of measurements, some binary signals are also often seen, such as ON and OFF of an agitator in the batch reactor, cooling water supply, etc.
2) The system provides a scalable data scanner for identifying and removing outlier batches and a batch data pre-processer for batch data resampling (synchronizing) if the batch data are sampled at different sampling rate;
  a) Batch variables' measurements are screened for significant "irregular" behaviors compared to other batches, including but not limited to large gaps (missing data), measurement outliers, sensor failures, etc.;
  b) For each problematic variable identified above, a data-repair algorithm with certain criterion is applied to the data for a repair;
  c) Remove invalid batches after data repair, such as those batches contains significant different variation profiles compared to other batches over the batch time;
  d) Resample selected batch variables with a base sampling rate in the batch process, such as one measurement sample per minute;
  e) Export selected and pre-processed batch dataset for further analysis in batch alignment offline and online;
3) Select most representative batches for average profiles and selection of reference batch
  a) Among automated pre-selected batches, the system optionally displays those selected batches together with per variable profiles per view, along the time line of the batch progressing;
  b) User may select a subset of batches (between 10 and 30) for the batch alignment based on their view combined with his/her domain-knowledge;
  c) The system also provides an option for the user to discard one or more batch variables to join the batch alignment, typically some variables with flat trajectories that offers less information for batch alignment;
4) Determine the key batch variables:
  a) Apply Piecewise Linear Approximation (PLA) algorithm to each variable trajectory and quantitatively identify average trajectory shape;
  b) Compute curvature index for each batch variable at each batch phase;
  c) Calculate consistency index for each batch variable at each batch phase;
  d) Calculate smoothness index for each batch variable at each batch phase;
  e) Evaluate Alignment Scores (AS) defined for assessment of signature for each batch variable at each batch phase, based on the average trajectory shape, the curvature index, the consistency index, and the smoothness index;
  f) User may reference the AS to select key variables for each batch phase;

g) Optionally user selects the most important indicators and those variables with important phase markers (i.e., key events during the phase) among the identified key batch variables;
5) Selection of variable weightings, which reflects the relative importance of the corresponding variable in the formulated minimization math problem for batch alignment.
   a) If a variable was not selected by the user, its weighting is equal to zero;
   b) For those variables selected by the user, rank variables based on trajectory shape, i.e. the significance of variable values change;
   c) Assign base weighting according to rank generated above based on trajectory shape;
   d) Identify what is the spread of a variable at each batch phase, multiply base weightings by the spread measure;
   e) Find the largest value from step (4) at the highest rank;
   f) Determine the weightings of the variables within the highest rank as the maximum value from step (5) divided by the corresponding spread measure;
   g) Reduce the maximum value by a certain factor, determine the weightings of the variables within the next rank as the maximum value divided by the corresponding spread measure. Repeat this step for all the remaining ranks;
   h) Finally, multiply the current weightings by the consistency index;
6) Selection of other tuning parameters
   a) The system recommends keeping default values during batch alignment for DTW penalties and GSS tolerance threshold;
   b) The alignment window size, and DTW parameters for batch maturity interval size depend more on the specific dataset, the system provides users with a set of default parameters;
   c) The parameters for each term comprising the DTW and DTI objective functions, also depend on the specific dataset. The system recommends to use default values (i.e., unless alignment results are not deemed adequate);

Steps (1)-(6) may be performed on historical batch data, information of reference batch, phases at reference batch, key variables and their weighting parameters at each phase may be determined. Starting at step (7), the alignment of each batch (offline or online) may be performed based on these results obtained from step (1)-(6).

The system uses a sliding window that ends at the current time point; the online alignment operation may repeat at each sampling time interval with the progress of the underline batch process. At each sampling interval, the following steps are performed:

(7.1) Specify a running batch to perform alignment online;
(7.2) Determine the current batch phase in which the batch is running at;
(7.3) Select pre-determined corresponding variable weightings with an adjustment factor;
(7.4) Estimate the current batch maturity by solving an optimization problem defined by DTW with a reference batch;
(7.5) Further adjust variable weightings for DTI based on the estimated maturity in step (7.4);
(7.6) Adjust batch maturity bounds based on updated DTW solutions;
(7.7) Determine if the starting point of a sliding window needs to be updated;
(7.8) Compute prediction step to ensure no missing key time points;
(7.9) Increase sliding window size when necessary;
(7.10) Identify key alignment times;
(7.11) Optimize current alignment with GSS method and DTI to fine tune and finalize current alignment;
(7.12) Move and wait for next sampling cycle.

Major Work Steps and Detailed Methods

FIG. 1A illustrates an example method of the disclosure with a workflow diagrams. For both offline and online batch alignment, the major steps in FIG. 1A some embodiments of the method (and system) performs these steps as the following:

Load Batch Data from Plant Historian

The method 100 begins at step 102. The method 100, at step 102, loads batch historical operations data (measurements) for process variables of the subject batch process from a plant historian or asset database. In other embodiments, the method 100 (step 102) may load (import) operations data for the subject production process variables from other sources, such as other plant data servers, plant management systems, or any other resources of the plant. In yet other embodiments, the operations data may be loaded from a file format, including a spreadsheet file, a text file, a binary file, and such.

The loaded operations data includes continuous measurements for a number of batch process variables (process variable tags) for the subject production batch process, as typically measurements for multiple process variables and from many batches are stored in the plant historian or plant asset database over time for a production process. The method 100 (step 102) generates a raw batch dataset that contains the loaded original batch operation data for the process variables of the subject batch process, formatted as a set of time-series based on timestamps associated with the batch operations data.

Figure 1B:
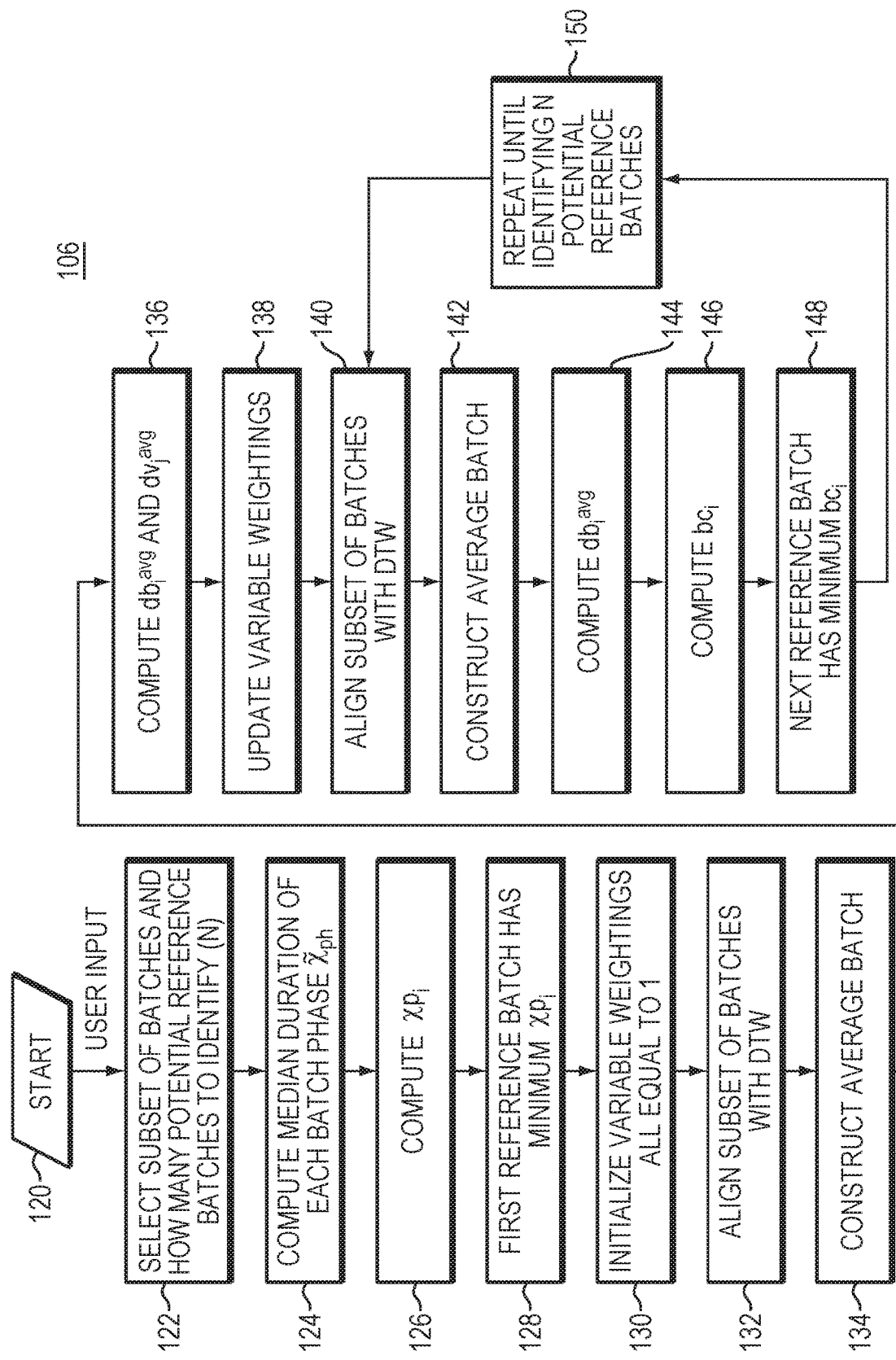
FIG. 1B is a flowchart of an example method for selecting reference batches.
Figure 1C:
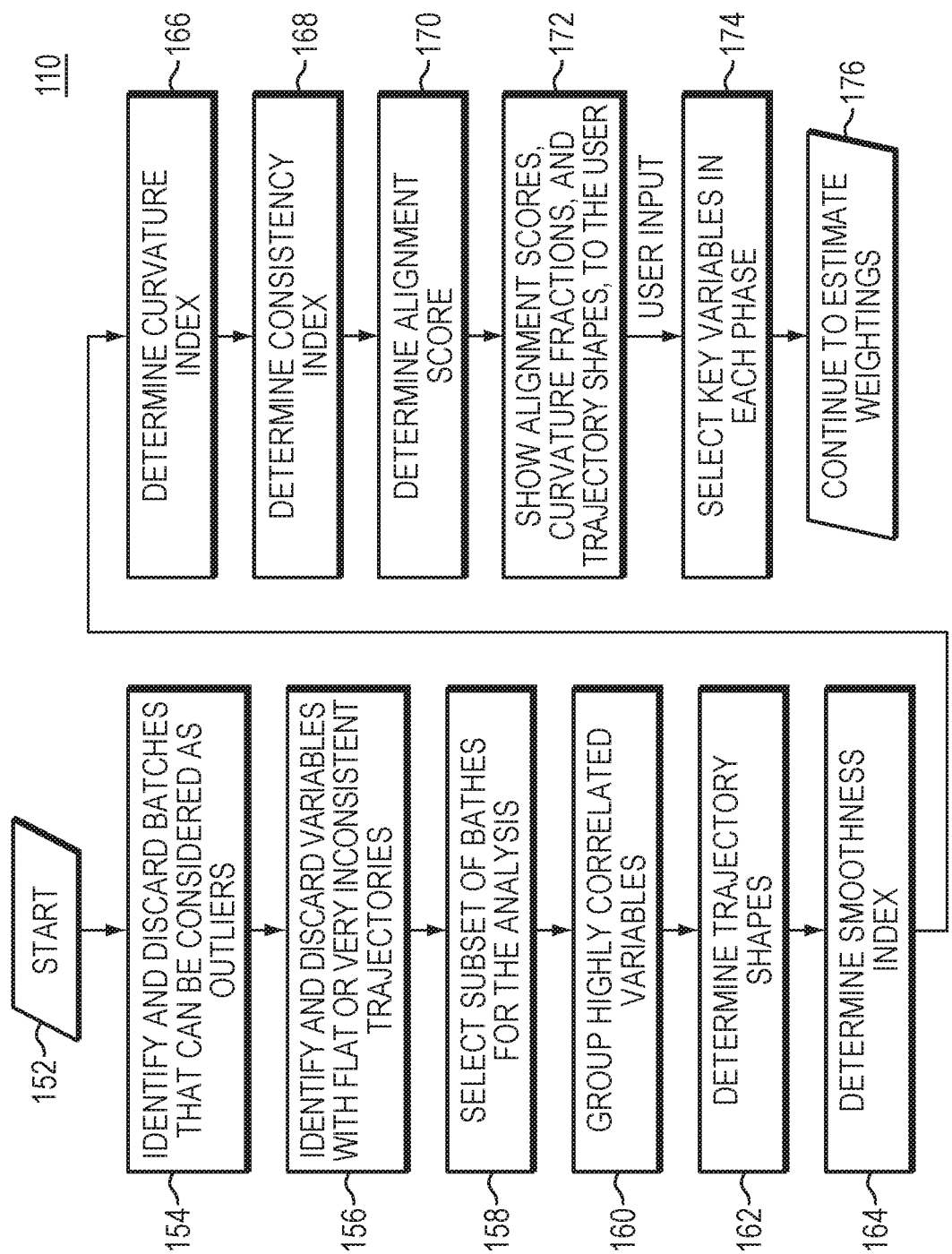
FIG. 1C is a flowchart of an example method for selecting key variables for batch alignment.
Figure 1D:
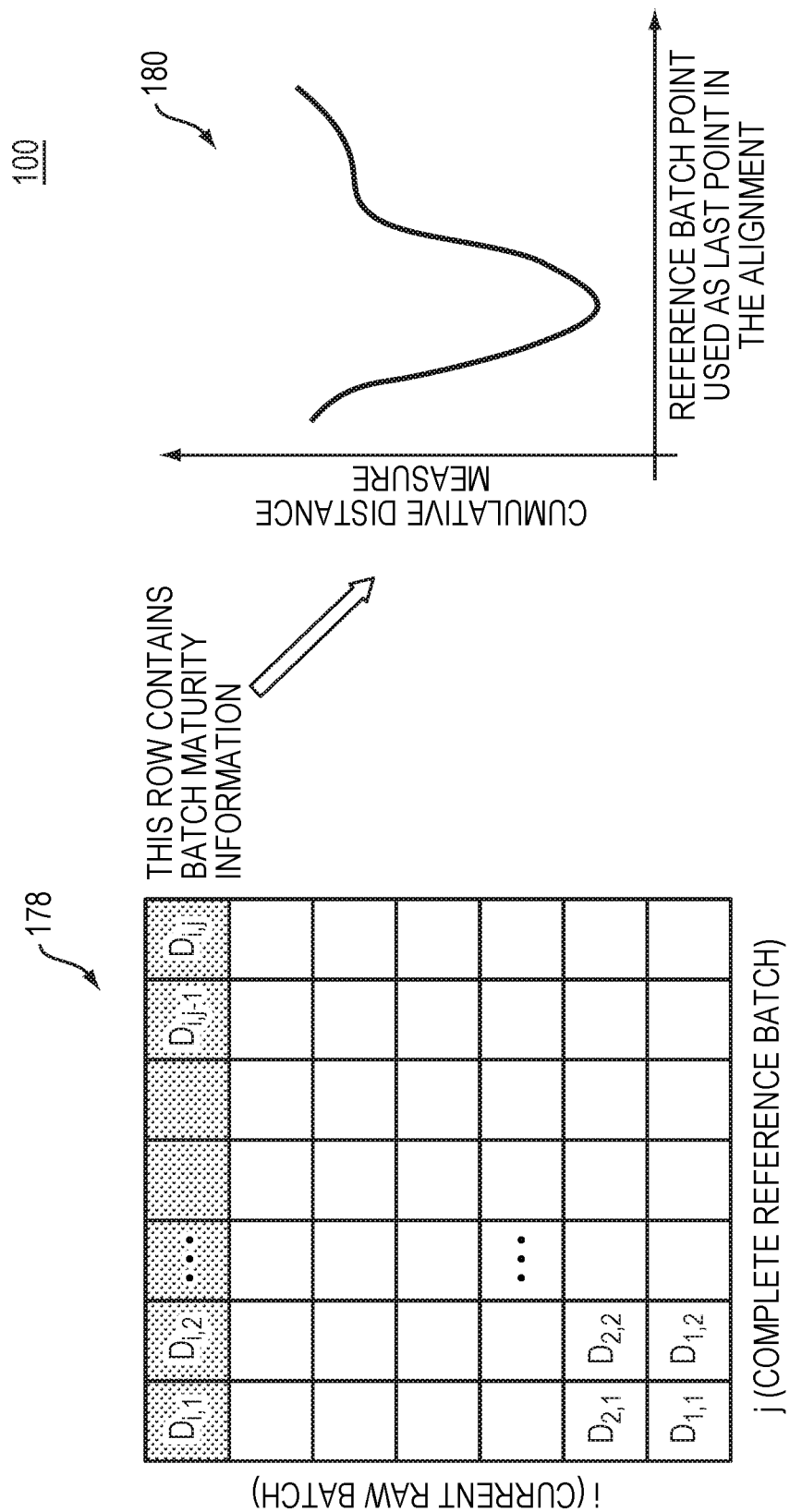
FIG. 1D illustrates a search grid in DTW algorithm used to estimate batch maturity.
Figure 1E:
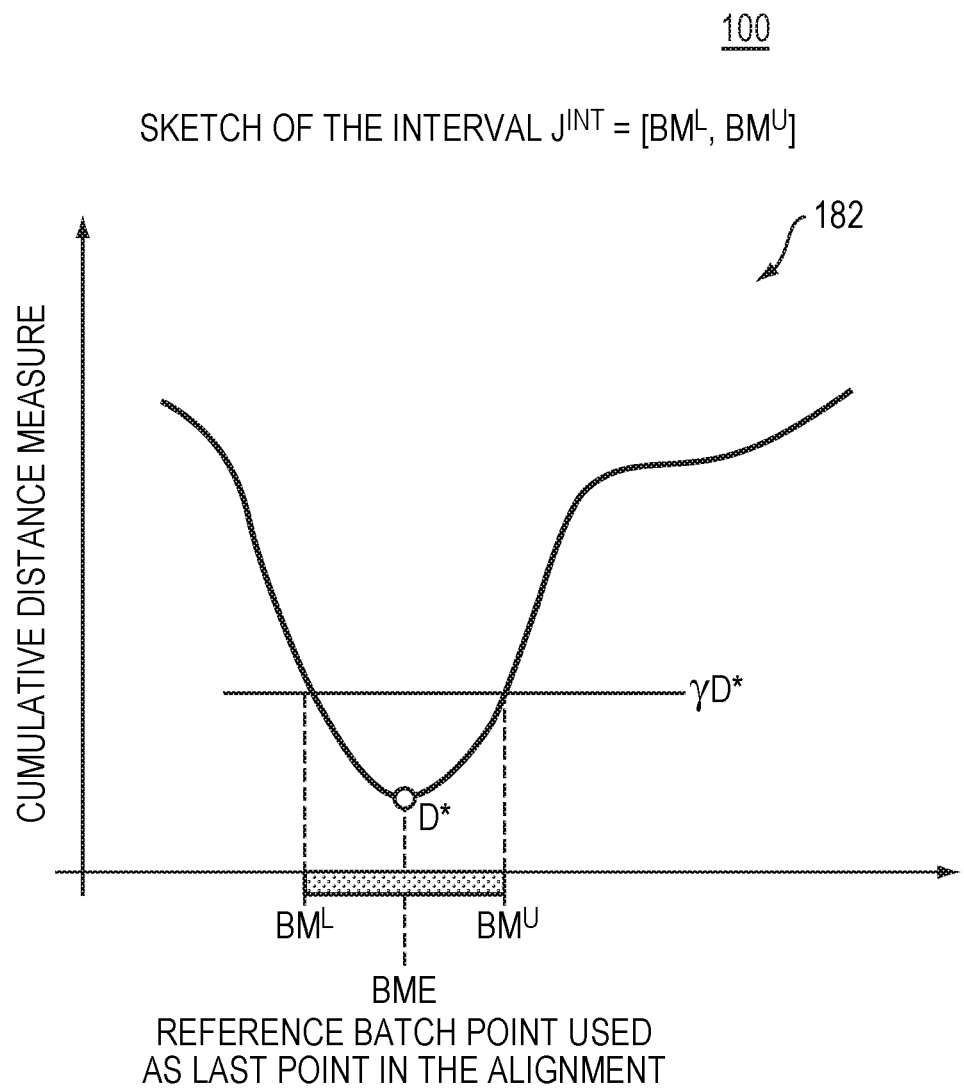
FIG. 1E illustrates a sketch of the search interval created based on DTW alignment results for batch maturity estimation.
Figure 1F:
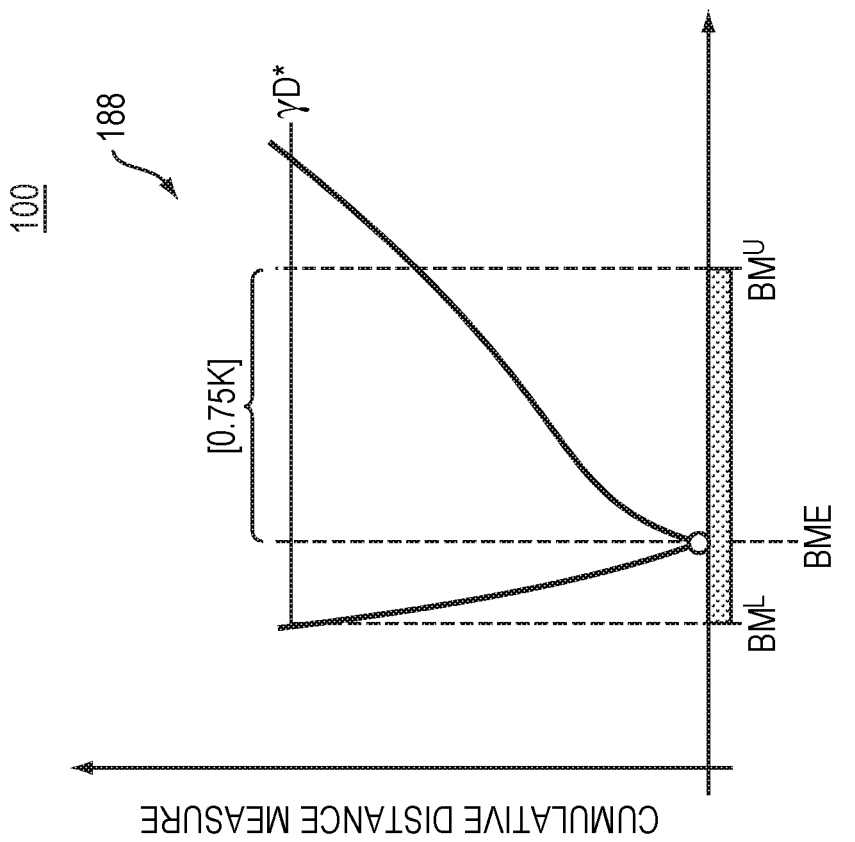
FIG. 1F illustrates a sketch of the search interval upper and lower bounds.
Figure 1F:
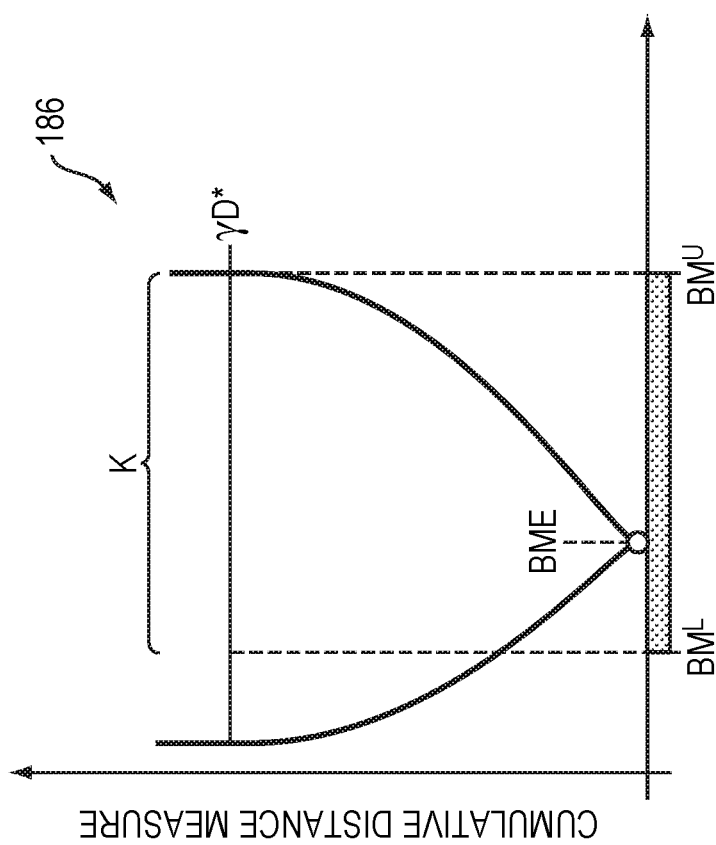
Figure 1G:
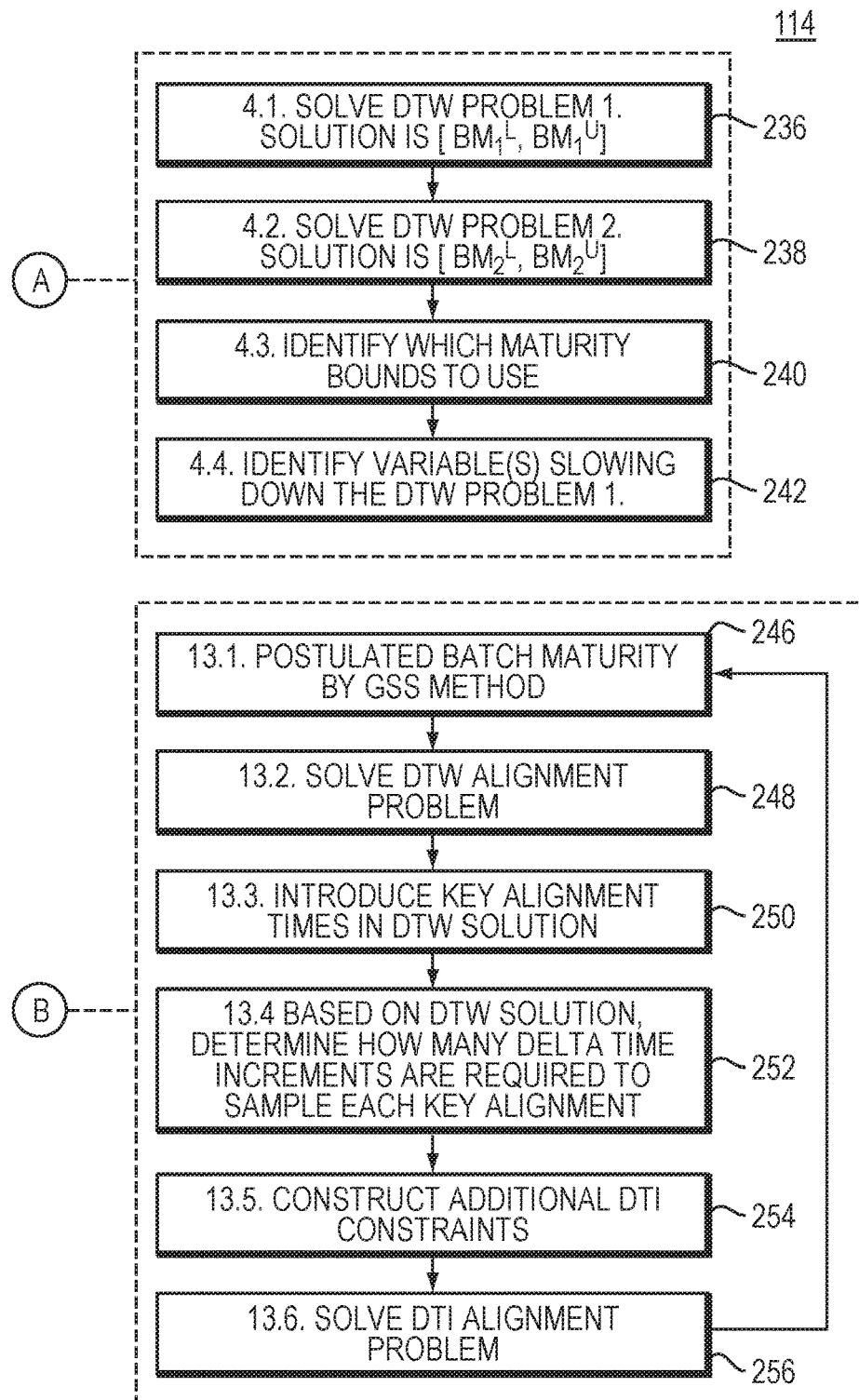
FIG. 1G (collectively, FIGS. 1G-I and 1G-II) is a flowchart of an example method of online batch alignment.
Figure 1H:
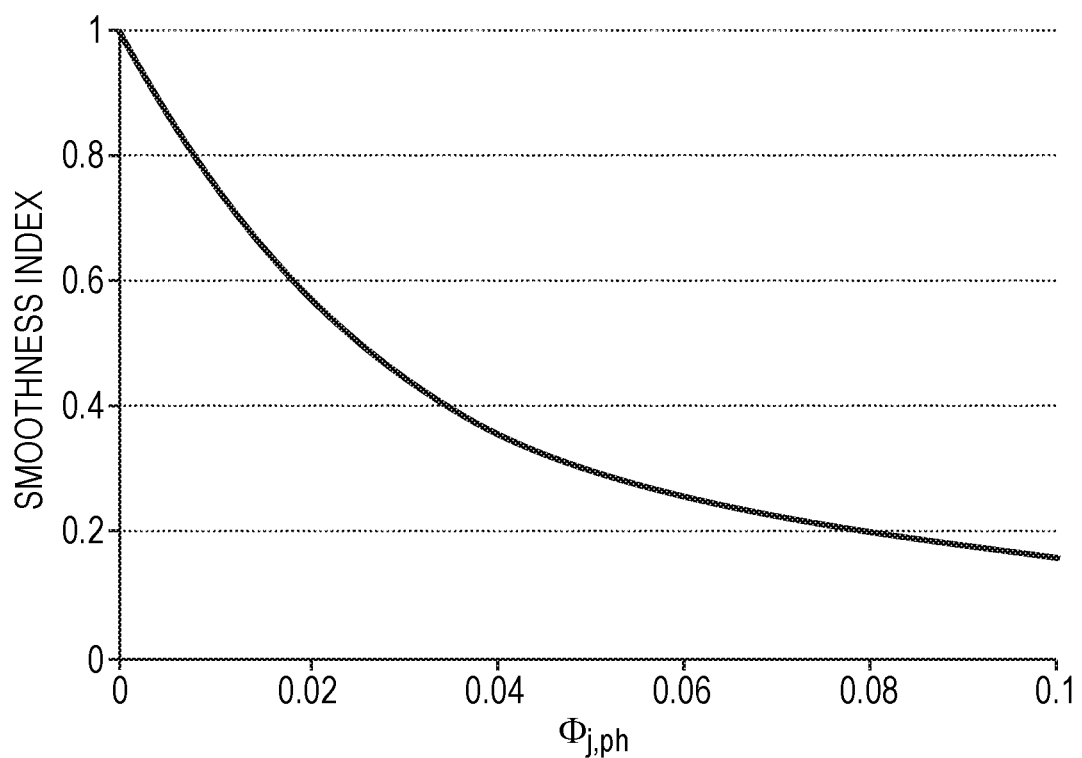
FIG. 1H illustrates a graph of smoothness index, according to some embodiments.
Figure 1I:
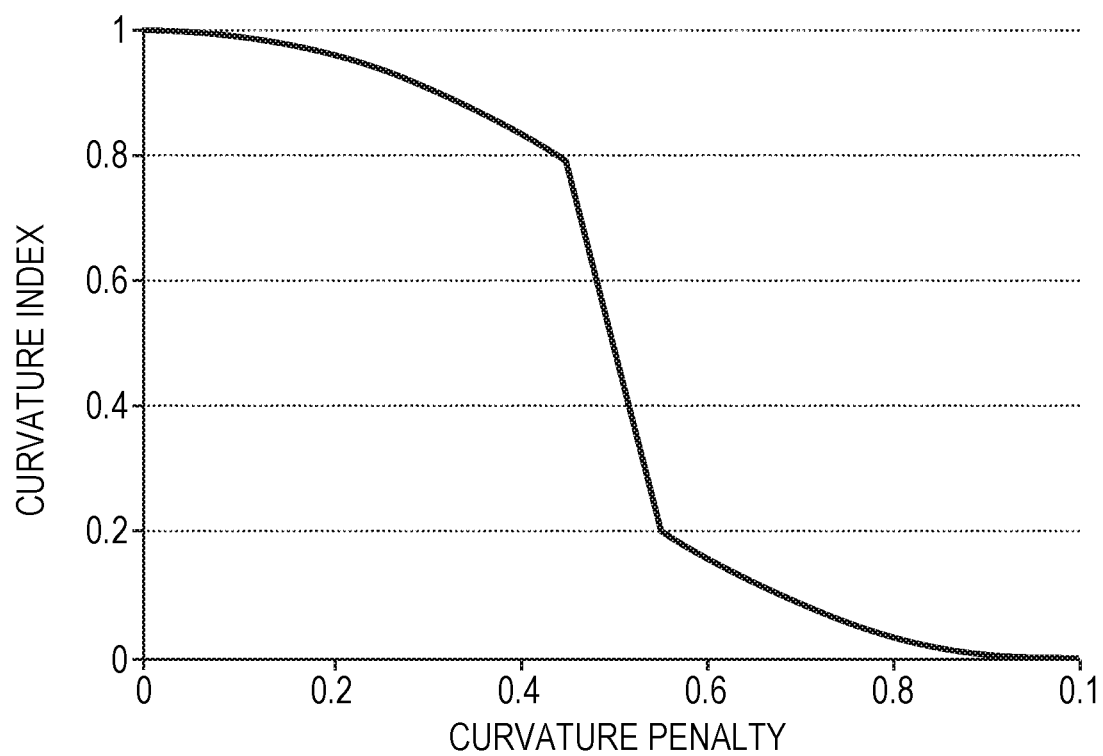
FIG. 1I illustrates a graph of curvature index versus curvature penalty, according to some embodiments.
Figure 1J:
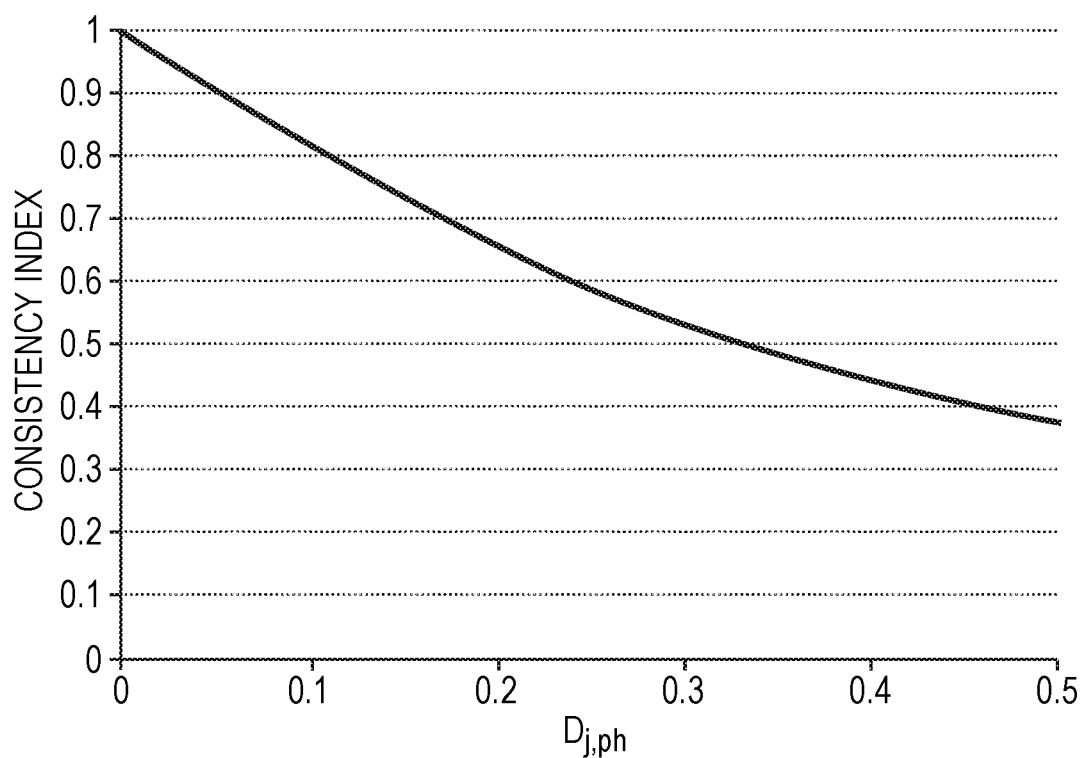
FIG. 1J illustrates a graph of consistency index versus phase, according to some embodiments.

FIGS. 1H-J illustrate various additional graphs, according to some embodiments. FIG. 1H illustrates a graph of smoothness index, according to some embodiments. FIG. 1I illustrates a graph of curvature index versus curvature penalty, accord lhing to some embodiments. FIG. 1J illustrates a graph of consistency index versus phase, according to some embodiments.

Figure 2A:
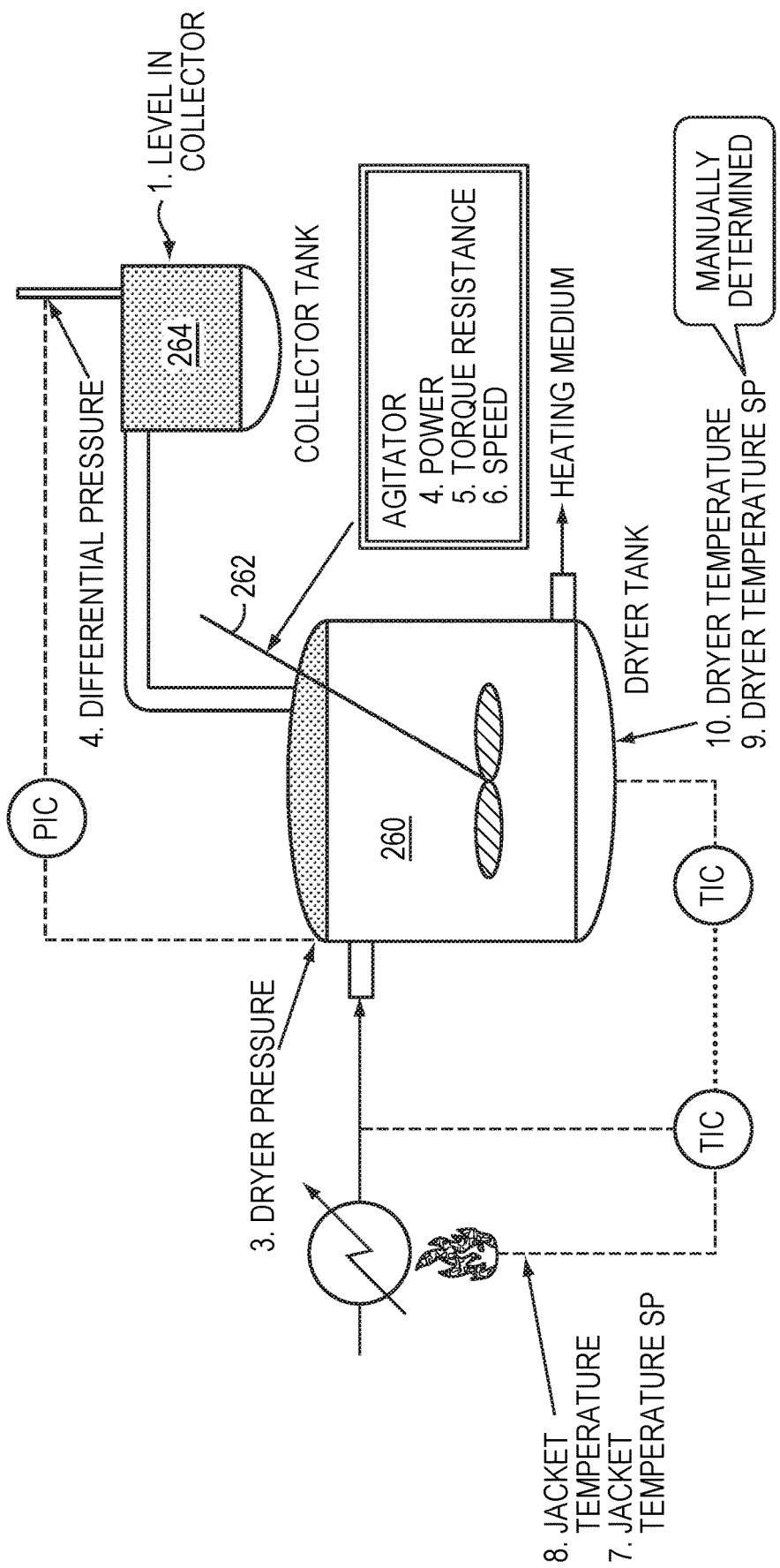
FIG. 2A is a schematic view of an example industrial batch reactor and a dryer that produce a chemical product.
Figure 2B:
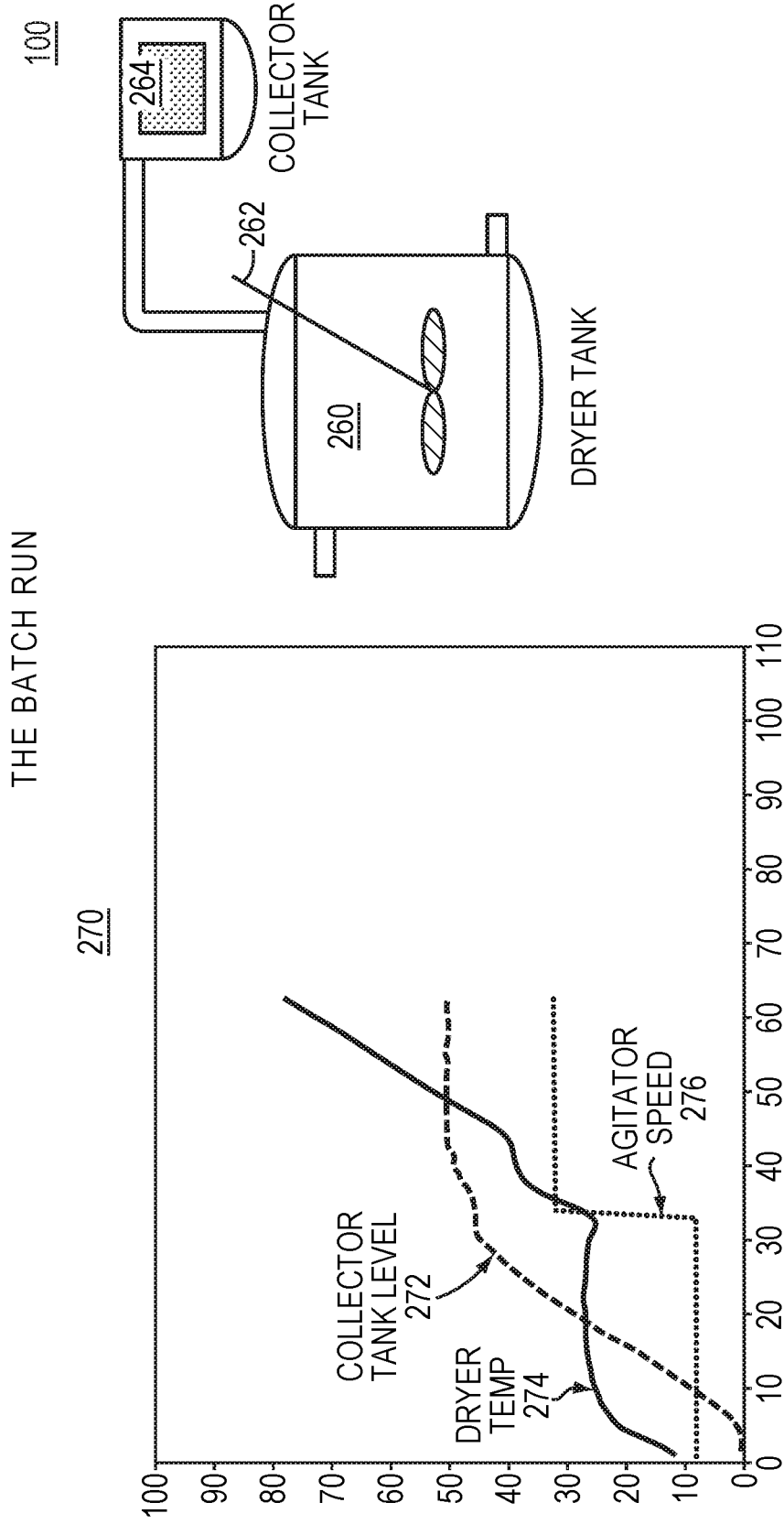
FIG. 2B illustrates is of an example batch reactor in the middle of a batch run.

FIG. 2A is a schematic view of an example industrial batch reactor and a dryer that produce a chemical product. FIG. 2A illustrates an example of batch process with batch variable measurements that are collected and recorded for each batch run. As illustrated in FIGS. 2A-B, the batch reactor or dryer processes may include a dryer tank 260, an agitator 262, and a collector tank 264.

FIG. 2B illustrates an example batch reactor in the middle of a batch run. FIG. 2B shows variable measurements 272, 274, 276 during a given batch run 270 and shows that the batch is progressing half way.

Figure 2C:
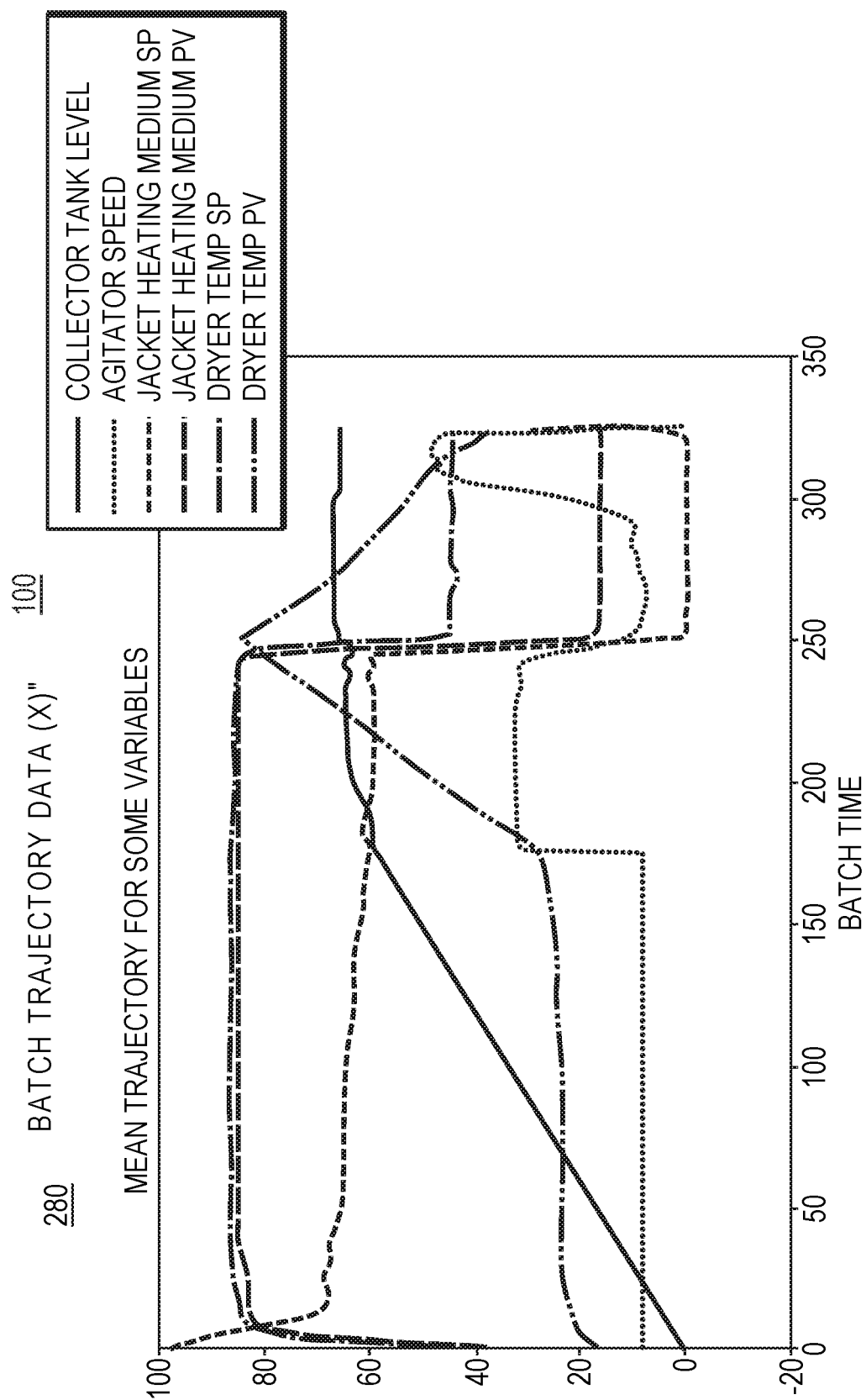
FIG. 2C a graphic illustration of an example completed batch with 6 variable measurements recorded.

FIG. 2C a graphic illustration of an example completed batch with 6 variable measurements recorded. FIG. 2C illustrates completed batch variables measurements 280 recorded during the whole batch.

Figure 2D:
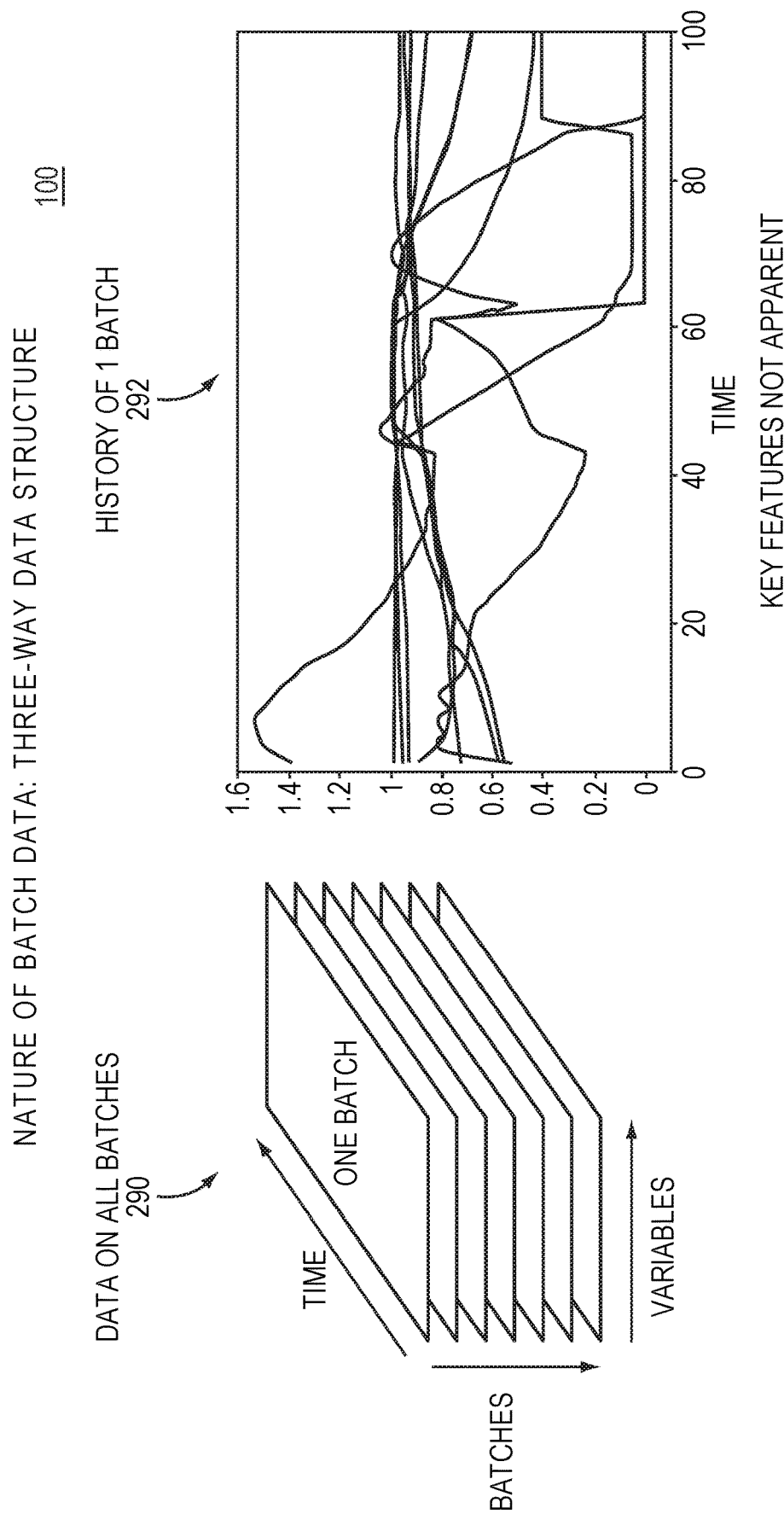
FIG. 2D is a schematic illustration of a typical batch process historical batch dataset recorded from past batch runs and organized in a 3-way structure.

FIG. 2D is a schematic illustration of a typical batch process historical batch dataset recorded from past batch runs and organized in a 3-way structure. FIG. 2D shows the historical data structure of multiple batches including data for the batches 290 and history of a given batch 292. Embodiments may start with loading the raw batch variables measurements from a plant batch data historian.

Scale Batch Data

Referring back to FIG. 1A, as illustrated in step 104 of FIG. 1A, for batch alignment and required analysis and modeling, the method 100 may scale batch variables' measurements. In the example embodiments, the 3-way batch data shown in FIG. 2D is unfolded in an "observation-wise" way into a 2-dimension matrix (i.e., each column of the unfolded matrix corresponds to a variable/tag, and the time series from each batch are appended at the bottom of data matrix). Then, each column is mean centered and scaled to unit variance. If there are missing values, they are filled with the last known value using a "zero-order hold" strategy. If the standard deviation value of a batch variable (a column) is very small (e.g. less than 1E-4), the unit value of 1.0 is used instead (i.e., these are flat trajectories).

Select Reference Batch

As illustrated in step 106 of FIG. 1A, in example embodiments, the method (and system) 100 may select a reference batch 106. As such, embodiments allow users to interact with the system and take the advantage of users' input or selection based on their domain knowledge. The method (and system) 100 provides a list of candidate batches based on batch data analysis behind the UI.

The list of candidate batches for reference batch is constructed by searching for those batches close to the average batch. To construct the average batch, preliminary data alignment is required. This is done with DTW for a quick search (see details about DTW later). The method also accounts for the difference of the phase lengths w.r.t. median phase durations.

FIG. 1B (step 106 of FIG. 1A) is a flowchart of an example method for selecting reference batches. According to some embodiments, FIG. 1B shows the steps of determining one or more candidate reference batches.

In step 122, the method (and system) 100 accept users' inputs to specify how many batches to identify as potential reference batches (N) and a subset of batches SB.

Step 124 determines the median duration of each batch phase $\tilde{x}_{ph}$. Then, the method (and system) 100 computes the square relative difference w.r.t. median phase duration $xr_{i,ph}$:

$$xr_{i,ph} = \left(\frac{x_{i,ph} - \tilde{x}_{ph}}{\tilde{x}_{ph}}\right)^2 \forall i$$

Where $x_{i,ph}$ is the duration of phase ph in batch i. Then, the method (and system) 100 computes 126 $xp_i$:

$$xp_i = \sum_{ph} xr_{i,ph} \forall i \in SB$$

$xp_i$ is the sum of the squared relative differences w.r.t. to each median phase length for a single batch. The first possible reference batch is determined 128 to be the reference batch with the minimum value of $xp_i$. This batch is added to the set of reference batches (RF).

1) In step 130, the method (and system) 100 initializes variable weightings equal to 1 for one or more variables.
2) In step 132, the method (and system) 100 aligns selected subset of batches SB in Step 122 using DTW and constructs an average batch:

$$y_{j,k}^{Average} = \frac{1}{|SB|} \sum_{i \in SB} y_{i,j,k}^{Aligned} \forall j, k$$

3) In step 134, the method (and system) 100 computes the mean square difference for each variable and batch among the selected subset of batches SB, $d_{i,j}^{avg}$:

$$d_{i,j}^{avg} = \frac{1}{K} \sum_{k=1}^{K} w_j \left(y_{j,k}^{Average} - y_{i,j,k}^{Aligned}\right)^2 \forall i$$

Where subscript j is for variables/tags, and k is for observations. Parameter K is the total number of observations (samples of each process variable) in the reference batch.

4) In step 136, the method (and system) 100 computes the average mean square difference for each batch $db_i^{avg}$:

$$db_i^{avg} = \frac{1}{J} \sum_{j=1}^{J} d_{i,j}^{avg} \forall i$$

Where J is the total number of variables/tags.

5) In some embodiments, method (and system) 100, preferably after the first alignment, computes the average mean square difference for each variable $dv_j^{avg}$ and updates 138 the variable weightings. With the new variable weightings, the method (and system) 100 repeats 150 the alignment (i.e., goes back to step 140).

$$dv_j^{avg} = \frac{1}{|SB|} \sum_{i \in SB} d_{i,j}^{avg} \forall j$$

$$w_j = \frac{1}{dv_j^{avg} + 1E - 3} \forall j$$

6) Step 144 After the second and subsequent alignments, compute the coefficient $bc_i$:

$$bc_i = 0.8 db_i^{avg} + 0.2 xp_i \forall i \in SB$$

7) For batches previously selected as reference, set their $bc_i$ values equal to a large number in step 146:

$$bc_i = 1E + 8 \forall i \in RF$$

8) Pick the batch with the minimum $bc_i$ value as the next reference 148 and add it to set RF.
9) Re-align data and re-compute $bc_i$ (i.e., repeat steps 140 through 148). Repeat 150 until set RF has N elements.

Add/Modify Batch Phases

Referring back to step 104 of FIG. 1A, in batch operations, often seen are more than one phases (periods) during a batch, such as feed period, heat-up, hold for reaction/growth, settle, product-out, etc. If no batch phases information is supplied with the batch data, or if those supplied are not a good fit for the alignment procedure, then defining or adding new batch phases can improve the alignment results. This improvement is due to variable weightings being determined for these specific phases.

Once a reference batch has been selected, then batch phase boundaries can be placed on such batch. The method (and system) allow user to indicate the end points of the batch phases (the observation number/time in the reference batch), and which variable is associated with such phase boundary. Then, the variable trajectories with events associated with selected phase boundaries are aligned using DTW (i.e., one variable in each alignment problem with weighting equal to 1). After the alignment, the point of the raw batch aligned with the phase boundary in the reference is selected as the end point of the phase in the raw batch.

Select Key Variables (step 110 of FIG. 1A)

In some embodiments, in step 110 of FIG. 1A of the method (and system) 100, a batch dataset may contain a number of variables. However, not all of variables are required to include relevant information from the point of view of the alignment method. Four or more aspects can be analyzed from each variable trajectory:
  Trajectory shape
  Curvature
  Smoothness
  Consistency A potential key variable has a defined trajectory shape, the trajectory is not flat, it is very consistent from batch to batch, and it is smooth.

FIG. 1C is a flowchart of an example method for selecting key variables for batch alignment. According to some embodiments, FIG. 1C (step 110 of FIG. 1A) shows the steps to determine potential variables from which the user can select as key variables.

Discarding Variables with Flat Trajectories (Step 156 of FIG. 1C)
  10) If the standard deviation of a variable trajectory is below 0.08 in more than 80% of the regular batches, it is considered as a flat trajectory;
  11) Discard variables with flat trajectories;

Selecting a Subset of Batches (Step 158 of FIG. 1C)

The analysis to determine key variables and their weightings is not required to be done considering all the batches in the dataset. The subset preferably has between 10 and 30 representative good batches. The subset of batches used here can be the same as the one used in the selection of reference batch procedure. It is recommended that the subset of batches may not contain batches previously identified as gross outliers. The subset of batches is denoted as SB herein.

Grouping Highly Correlated Variables (Step 160 of FIG. 1C)
  12) Based on the total number of original variables, define number of groups/clusters (number of groups is smaller than total number of variables).
  13) Considering the selected subset of batches, unfold the batch data X(batches×variables×time stamps) as X̃((batches·time stamps)×variables) (observation-wise unfolding).
  14) Build PCA model.
  15) Multiply loadings by the corresponding explained variance of each principal component. The resulting matrix is denoted as weighted loadings.
  16) Set the weighted loadings of variables with highly inconsistent or flat trajectories equal to 10000.
  17) Apply K-means clustering algorithm on the weighted loadings (any clustering algorithm can be used here).
  18) Identify the group with bad variables (i.e., those from step 5).
  19) If the other groups have one variable (and there are more than 4 variables), reduce the number of groups by 2 and go back to step 6.

Identifying Trajectory Shape (Step 162 of FIG. 1C)
  20) For each batch in the selected subset, each variable, and each phase, apply the piecewise linear approximation (PLA) algorithm (Keogh, E., Chu, S., Hart, D., & Pazzani, M. "Segmenting Time Series: A Survey and Novel Approach," In M. Last, A. Kandel & H. Bunke (Eds.), Data mining in time series databases (pp. 1-15), Singapore: World Scientific Publishing (2004)) with maximum error allowed equal to 0.15.
  21) Gather information about the number of horizontal, vertical, and diagonal segments, number of segment type transitions, number of changes in the slope sign, etc.
  22) Based on this information and following a set of conditions, variable trajectory shapes are automatically identified as to one of the four main categories: "Curve", "Steps", "Inconsistent", and "Flat". The trajectory subtypes are identified as well (these are used to identify trajectories as inconsistent). Current possible options for trajectory types are the following (Main type-subtype):
    a) Steps-steps
    b) Steps-ramp
    c) Curve-monotonic
    d) Curve-ramp
    e) Curve-unimodal
    f) Curve-bimodal
    g) Curve-oscillatory
    h) Curve-steps
    i) Inconsistent-inconsistent
    j) Flat-flat
    Horizontal segments definition: absolute value of the slope is ≤0.001
    Vertical segments definition: absolute value of the slope is ≥0.25
    Diagonal segments definition: Those that are neither horizontal nor vertical segments.

Note that fixed constants (0.001 and 0.25) can define the segments since the batch data is assumed to be scaled to unit variance.

Determining Smoothness Index (Step 164 of FIG. 1C)
  23) For each batch and each variable j, filter the entire trajectory using a zero-phase moving average filter).
    a) Do not filter "Flat" or "Steps" trajectories
  24) Compute the differences between the original and the filtered trajectories:

$$df_{i,j,k} = abs(y_{i,j,k}^{filter} - y_{i,j,k}) \forall j, k, i \in SB$$

25) If the absolute value of this difference ($df_{i,j,k}$) is greater than 0.5, then set it equal to 0. This is done because the large difference might be due to the effect of the filter
  26) Square the differences:

$$df_{i,j,k}^{squared} = (df_{i,j,k})^2 \forall j, k, i \in SB$$

27) For each batch, each phase, and each variable, sum the squared differences and divide them by the length of the phase:

$$df_{i,j,ph}^{sum} = \frac{1}{|K_{i,ph}|} \sum_{k \in K_{i,ph}} df_{i,j,k}^{squared} \ \forall \ j, ph, i \in SB$$

28) For each phase and each variable, compute the average of the values from step "5" immediately above ($\varphi_{j,ph}$):

$$\varphi_{j,ph} = \frac{1}{|SB|} \sum_{i \in SB} df_{i,j,ph}^{sum} \ \forall \ j, ph$$

29) Compute the smoothness index $si_{j,ph}$ of variable j in phase ph as:

$$si_{j,ph} = 1 - \left(\frac{2}{\pi}\right)\arctan(15\varphi_{j,ph}) \; \forall \; j, ph$$

Note that $si_{j,ph} \in [0,1]$.

FIG. 1H illustrates a graph of smoothness index $si_{j,ph}$ versus variable $\varphi_{j,ph}$, according to some embodiments.

Determine Curvature Index (Step 166 of FIG. 1C)

30) For each variable j, and each phase ph, compute the curvature magnitude $cm_{j,ph}$ $$cm_{j,ph} = median_{i \in SB}\left(\frac{1}{L_{i,ph}} \sum_{k \in K_{i,ph}} 0.95 \; abs(\Delta^2 y_{i,j,k})\right)$$

$$\Delta y_{i,j,k} = y_{i,j,k} - y_{i,j,k-1} \; \forall \; i \in SB, j, k \in K_{i,ph}$$

$$\Delta^2 y_{i,j,k} = \Delta y_{i,j,k} - \Delta y_{i,j,k-1} \; \forall \; i \in SB, j, k$$

Where SB is the subset of batches under consideration, the subscript i indicates the batches, k the time stamp, y the scaled values of the trajectory, $L_{i,ph}$ is the length of phase ph in batch i, $K_{i,ph}$ is the set of time stamps in phase ph in batch i.

31) For each variable j, and each phase ph, compute the curvature penalty $cvp_{j,ph}$ $$cvp_{j,ph} = \frac{3}{4}\left[\sum_{third=1}^{third=3} abs\left(\frac{cm_{j,ph,third}}{cm_{j,ph}}\right)\right]$$

$$cm_{j,ph,third} = median_{i \in SB}\left(\frac{1}{L_{i,ph,third}} \sum_{k \in K_{i,ph,third}} 0.95 \; abs(\Delta^2 y_{i,j,k}) + 0.05 \; abs(\Delta y_{i,j,k})\right) \; \forall \; third, j, ph$$

Where $cm_{j,ph,third}$ is the curvature magnitude of each third of the batch phase, $L_{i,ph,third}$ is the length of each third of phase ph in batch i, $K_{i,ph,third}$ is the set of time stamps in each third of phase ph in batch i. Note that $cvp_{j,ph} \in [0,1]$.

FIG. 1I illustrates a graph of curvature index $cvi_{j,ph}$ versus curvature penalty $cvp_{j,ph}$, according to some embodiments.

32) For each variable j, and each phase ph, compute the curvature index $cvi_{j,ph}$ $$cvi_{j,ph} = \begin{cases} 1 - (cvp_{j,ph})^2 & \text{if } cvp_{j,ph} \leq 0.45 \\ 0.7975 - 5.95(cvp_{j,ph} - 0.45) & \text{if } 0.45 < cvp_{j,ph} < 0.55 \\ (1 - cvp_{j,ph})^2 & \text{if } cvp_{j,ph} \geq 0.55 \end{cases}$$

33) If the trajectory has a step pattern (i.e., its main trajectory type is defined as "Steps"), and if two of three $cm_{j,ph,third}$ values are between 0.45 and 0.55, then set its curvature index to 0.05. The reason to do this is because the associated trajectory is very likely to have two step changes and that can be a potential phase marker.

Note that $cvi_{j,ph} \in [0,1]$.

Determine Consistency Index (Step 168 of FIG. 1C)

34) Select a reference batch

35) For each batch (from the subset of batches under consideration, and not including the reference), each variable j, and each phase ph, compute the cumulative distance against its reference trajectory in reference batch using DTW
   a) Align one variable at a time
   b) The cumulative distance is the value of the objective function calculated by DTW 36) Compute the average cumulative distance (i.e., the average of the DTW solutions from step 2) for each variable and each phase ($D_{j,ph}$)

37) Compute the consistency index $csi_{j,ph}$ as:

$$csi_{j,ph} = 1 - \left(\frac{2}{\pi}\right)\arctan(3D_{j,ph}) \; \forall \; j, ph$$

Note that $csi_{j,ph} \in [0,1]$.

FIG. 1J illustrates a graph of consistency index $csi_{j,ph}$ versus phase $D_{ji,ph}$, according to some embodiments.

Determine Alignment Scores (Step 170 of FIG. 1C)

There are two alignment scores which are computed for each variable and each phase by multiplying the curvature, consistency, and smoothness indices:

score_1$_{j,ph}$ score_2$_{j,ph}$=(1

Note that score_1$_{j,ph}$, score_2$_{j,ph}$ $\in [0,1]$.

The closer the first alignment score score_1$_{j,ph}$ is to 1, the bigger the possibility that variable j can potentially work as an indicator variable for phase ph (i.e., curvature index $cvi_{j,ph}$ is close to 1).

The closer the first alignment score score_2$_{j,ph}$ is to 1, the bigger the chance that variable j can potentially work as a variable with key event during the phase ph (i.e., curvature index $cvi_{j,ph}$ is close to 0).

Select Key Variables (Steps 172 and 174 of FIG. 1C)

Based on alignment scores (step 172), embodiments allow user to select the key variables for each batch phase (step 174)

The user may be able to see corresponding batch trajectories for cases when there is no significant difference between scores General guidelines:
   High alignment scores
   From different groups
   With different specific trajectory shapes Further, embodiments may continue to estimate weightings (step 176). From the key variables, the user selects those with phase markers, information about variable attributes may be displayed to the user as described below.

Figure 4:
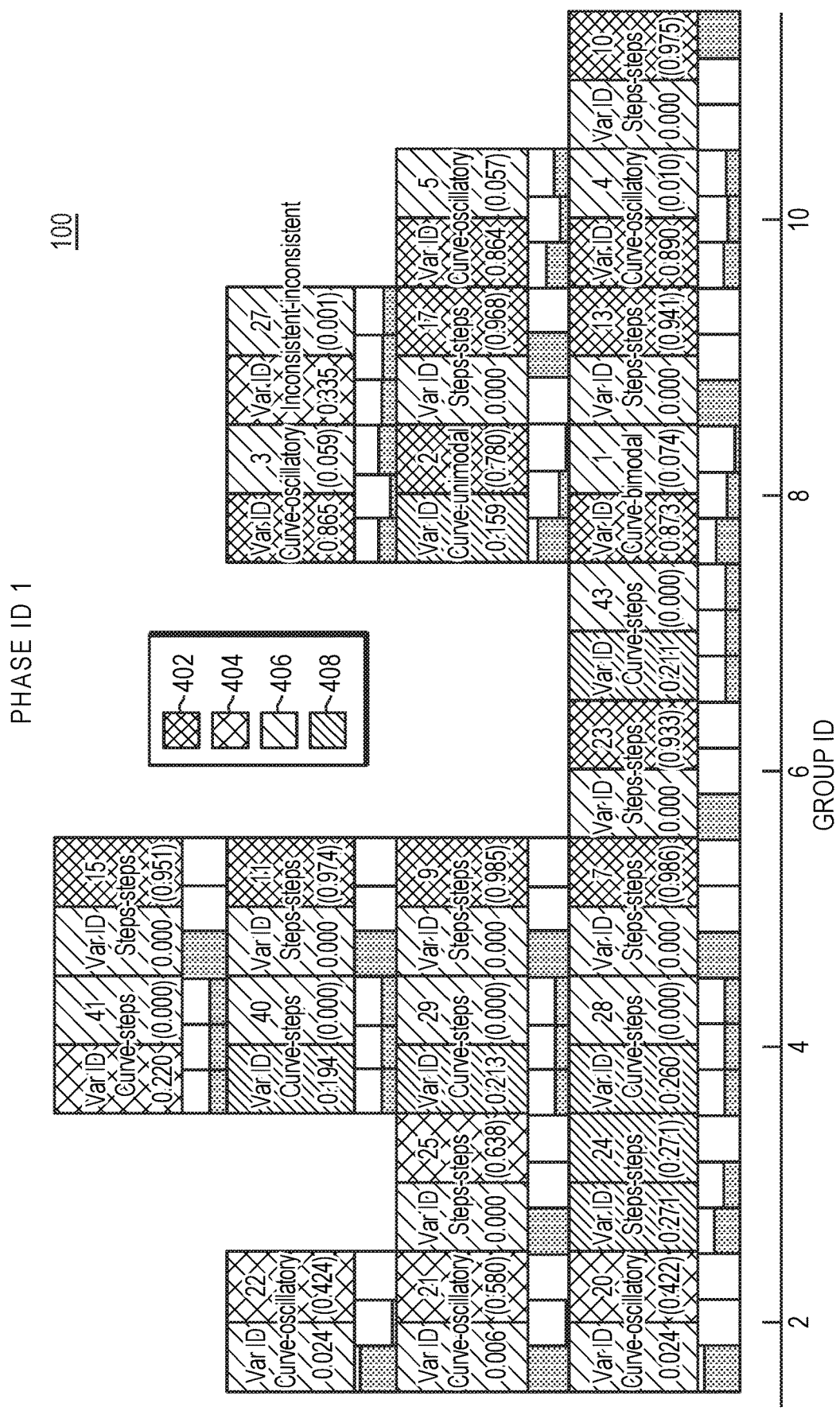
FIG. 4 illustrates a user interface (UI) display with calculated results for user to select key variables.

Referring to FIG. 4, the method (and system) 100 may include the variable ID, the trajectory type, the first and second alignment scores, and may indicate the curvature fraction at each third of the phase (the black portion of each on the three white boxes underneath each box pair). Elements on the left-most boxes of each box pair reflect the value of the first alignment score. Elements of the right-most boxes of each pair of boxes reflect the value of the second alignment score. Elements 402 indicate alignment scores close to 1. Other alignment scores not close to 1 are represented by elements 404, 406, 408, respectively. It also shows the variables in each group. The x axis shows the group ID. Highly correlated variables are stacked on top of each other.

38) The user selects the key variables for each batch phase.
   a) The user may base his/her decision on the alignment scores, as well as the actual trajectory shapes. For that reason, the system asks the user if he/she wants to see any of the variable trajectories.
   b) The user may pick between 0 and 3 variables from each group.
39) From the key variables selected in step b, the user selects the variables with phase markers, or those without phase markers that are more important than the rest (i.e., which variables are consistently very close to the reference).

For each of these two steps, the method (and system) 100 shows the user suggested key variables (but he/she still makes the final decision). Such variables were chosen following the next steps:

40) Determine largest alignment score (considering both scores 1 and 2) for trajectories (MaxScore)
41) Remove variables with max{alignmentScore1, alignmentScore2}<0.6MaxScore
42) Determine largest consistency index for Steps trajectories (MaxCSI_Steps), Curve trajectories (MaxCSI_Curve), and Inconsistent trajectories (MaxCSI_Inconsistent).
43) Remove variables with Steps trajectory with csi<0.9MaxCSI_Steps
44) Remove variables with Curve trajectory with csi<0.6MaxCSI_Curve
45) Remove variables with Inconsistent trajectory that with csi<0.6MaxCSI_Inconsistent
46) Considering the remaining variables, for each group, pick at most two Curve trajectories, two Steps trajectories, and 1 Inconsistent trajectory. Use consistency index as tiebreaker.
47) If the number of suggested key variables for a phase is larger than 12, repeat Step 7 but picking at most one Curve trajectory, one Steps trajectory, and one Inconsistent trajectory from each group.
48) Variables associated with maximum consistency indices from Step 3 are suggested as variables of higher importance.

Assigning Variable Weightings (Step 112 of FIG. 1A)

Referring back to FIG. 1A, variables not selected by the user automatically get a variable weighting coefficient equal to zero, they could be completely removed from the problem if desired Based on the trajectory shapes and the user selection, the variable weightings are determined for each key variable in each phase based on the following default values:

| Trajectory shape | Base variable weighting |
|---|---|
| Rectilinear with phase marker | 1000 |
| Curve with phase marker | 100 |
| Irregular with phase marker | 100 |
| Rectilinear | 10 |
| Curve | 1 |
| Irregular | 0.1 |

Base variable weightings are then adjusted so that the variables in the same rank have penalties of the same magnitude depending on the expected deviation values on each trajectory;

The weighting is then multiplied by the corresponding consistency index.

Adjust Variable Weightings (Step 116 of FIG. 1A)

Optionally the embodiments may further adjust variable weightings by performing following:

Run the online batch alignment method on several good batches (avoid abnormal batches)

Determine the errors for each key variable

Increase the value of the weightings of key variables with the largest errors

Repeat until errors cannot be decreased

Dynamic Time Warping (DTW) Algorithm

Although DTW algorithm has some undesirable characteristics for a complete solution as mentioned earlier, the disclosed method still uses DTW for a quick and preliminary estimate of batch maturity. DTW is a discrete-time algorithm and therefore runs faster. The batch alignment can be formulated as a discrete-time minimization problem and solved based on dynamic programming (see González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5):462-475 (October 2014); Ramaker, H. J., van Sprang, E. N., Westerhuis, J. A., & Smilde, A. K., "Dynamic time warping of spectroscopic BATCH data," Analytica Chimica Acta, 498 (1), 133-153 (August 2003); Zhang, Y., & Edgar, T. F., "A Robust Dynamic Time Warping Algorithm for Batch Trajectory Synchronization," American Control Conference, pp. 2864-2869 (June 2008)). The DTW alignment method consists of two steps:

49) Filling out a grid of size I×J (where I is the number of points of the current batch, and J is the number of points of the entire reference batch) with the cumulative distances associated with each pair of points (i,j), denoted as $D_{i,j}$, where i represents a point of the current batch (i=1, ..., I) and j a point of the reference batch (j=1, ..., J).

50) Finding the optimal warping path on the grid by backtracking from point (I,J) to point (1,1) following the lowest $D_{i,j}$ values in the grid in a monotonic fashion.

The cumulative distance $D_{i,j}$ is computed using eq. (1):

$$D_{i,j} = \begin{cases} \min \begin{bmatrix} D_{i-1,j} + v_v d_{i,j} \\ D_{i-1,j-1} + v_d d_{i,j} \\ D_{i,j-1} + v_h d - i, j \end{bmatrix} & \forall (i,j) \text{ except } (1,1) \\ d_{i,j} & \forall (i,j) = (1,1) \end{cases} \quad (1)$$

Parameters $v_v$, $v_d$, and $v_h$, represent the cost associated with a vertical, diagonal, and horizontal move in the grid, respectively. $d_{i,j}$ represents the local distance measure between point i and j. It is computed using eq. (2):

$$d_{i,j} = \alpha \sum_{k=1}^{K} w_k (yRef_{k,j} - yRaw_{k,i})^2 + \quad (2)$$
$$(1-\alpha) \sum_{k=1}^{K} w_k (\Delta yRef_{k,j} - \Delta yRaw_{k,i})^2$$

Subscript k represents the kth variable considered in the alignment problem (k=1, . . . , K), and $w_k$ is the weight associated to such variable. Note that $w_k \geq 0$ $\forall k$, and $\Sigma_{k=1}^{K} w_k = 1$. By increasing the value of $w_k$, the aligned trajectory of variable k of the current batch may follow more closely the trajectory of such variable in the reference batch. $yRef_{k,j}$ is the jth point of variable k in the reference batch, while $yRaw_{k,i}$ is the ith point of variable k in the raw batch (i.e., current batch). $\Delta yRef_{k,j}$ and $\Delta yRaw_{k,i}$ are the first derivative approximations using finite differences:

$$\Delta yRef_{k,j} = \begin{cases} yRef_{k,j} - yRef_{k,j-1} & \forall j \geq 2 \\ yRef_{k,2} - yRef_{k,1} & \forall j = 1 \end{cases} \quad (3)$$

$$\Delta yRaw_{k,i} = \begin{cases} yRaw_{k,i} - yRaw_{k,i-1} & \forall i \geq 2 \\ yRaw_{k,2} - yRaw_{k,1} & \forall i = 1 \end{cases} \quad (4)$$

The parameter $\alpha$ (subject to $0 \leq \alpha \leq 1$) represents how much weight is put into the difference of the actual values, and the difference of the first derivative approximations.

Versions of DTW Employed in this Embodiment

1. DTW for Batch Data Alignment

This is the DTW version with fixed end point (described at the beginning of this section). Finding the optimal warping path from point (I,J) to point (1,1) is necessary.

2. DTW for Batch Maturity Estimation (Step 118 of FIG. 1A, Also Steps 178 and 180 of FIG. 1D)

This is the DTW version with free end point. This means that step 1 of the DTW alignment method is necessary to determine batch maturity (González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5):462-475 (October 2014)). The last row of the grid I×J contains the cumulative distance measures $D_{I,j}$. Following the idea presented in FIG. 1D, the batch maturity estimate (BME) of the current batch is the point $j^* = \text{argmin}\{D_{I,j}\}$.

The local distance for points (1,1), (1, 2), and (1, 3) are set to a high value to avoid selecting a portion of the reference batch smaller than 4 points, which is the minimum size required for the alignment method:

$$d_{I,j} = 1E+08 \forall 1 \leq j \leq 3 \quad (5)$$

3. Interval where to look for batch maturity (step 116 of FIG. 1A, see also element 182 of FIG. 1D). FIG. 1D (step 114 of FIG. 1A) illustrates a search grid in DTW algorithm used to estimate batch maturity.

Given that DTW is a discrete-time method (i.e., sampling times of the reference and raw batch are fixed), it is known that DTW can introduce distortions in the aligned trajectory. Thus, the proposed method can use DTW either to provide a single point estimate of the batch maturity, or an interval where to search for the true batch maturity. Let's denote the minimum cumulative distance as $D^* = \min_j\{D_{I,j}\}$. The point at which $D^*$ occurs is denoted as BME, which is the batch maturity estimate from DTW. The interval where to look for the true batch maturity is defined as $J^{INT} = [BM^L, BM^U]$ such that $D_{I,j}$ for any $j \in J^{INT}$ satisfies $D_{I,j} \leq \gamma D^*$, where $1 \leq \gamma \leq 1.03$. $\gamma$ is a parameter related to the size of interval $J^{INT}$, the larger the value of $\gamma$, the wider interval $J^{INT}$ is (see FIG. 1E). FIG. 1E (step 116 of FIG. 1A) illustrates a sketch of the search interval created based on DTW alignment results for batch maturity estimation.

Referring back to FIG. 1A, as shown in FIG. 1A, when aligning (step 118 of FIG. 1A) the batch data, the parameter $\gamma$ may not be useful to control the maximum size of interval $J^{INT}$. When there is too much uncertainty due to abnormalities in the batch, the upper and lower batch maturity bounds provided by DTW may become more distant. The batch maturity estimation method may be tilted to the lower bound because the deviations are less penalized by aligning against a shorter reference batch. Once the uncertainty decreases, the batch maturity jumps. To avoid unnecessary calculations (when there is too much uncertainty in DTW solution), it is necessary to keep the size of the interval $J^{INT}$ below a certain value $\kappa$ given as number of data points.

FIG. 1F (step 116 of FIG. 1A) illustrates a sketch of the interval $J^{INT} = [BM^L, BM^U]$ where a) The lower bound associated with $\gamma D^*$ is increased;

b) The upper bound associated with $\gamma D^*$ is reduced.

To keep the batch moving, if $BM^U - BM^L > \kappa$, then $BM^L = BM^U - \kappa$ (FIG. 1F, see element 186). Note that the upper bound is kept, the lower bound is modified. This is done to avoid slowing down the aligned batch too much. However, the batch maturity estimate (i.e., DTW's optimal solution) must be kept within the interval. Hence, if $BM^U - BME > \kappa$, then $BM^U = BME + \lfloor 0.75\kappa \rfloor$ (FIG. 1F, see element 188).

4. Parameter Values Used for DTW in the Example Embodiments

The following parameter values are used in DTW:

$\alpha = 1$ $v_d = 1$ $v_h = 1.2$ $v_v = 1.2$ $\gamma \in [1, 1.03]$ $\kappa = 30$ data points DTI—Dynamic Time Interpolation Algorithm To address the issues of DTW algorithm may create, the disclosed method uses DTI algorithm as a calculation engine to solve a re-defined batch alignment problem in a modified format. Dynamic Time Interpolation (DTI) is an optimization-based method that allows sampling of the current batch at different times other than the raw data times by using a linear interpolation function. The DTI based batch alignment is able to address the issue of distortions in the aligned batch trajectory by a DTW. Its mathematical optimization formulation is defined as shown below:

$$\min_{\Delta t_j} D = \frac{\alpha}{J} \sum_{k=1}^{K} \sum_{j=1}^{J} w_k (yRef_{k,j} - yInt_{k,j})^2 +$$

$$\frac{(1-\alpha)}{J} \sum_{k=1}^{K} \sum_{j=1}^{J} w_k (\Delta yRef_{k,j} - \Delta yInt_{k,j})^2 +$$

$$\frac{\beta}{RawBatchDuration} \sum_{j=1}^{J-2} (\Delta(\Delta t_j) - \Delta(\Delta t_{j-1}))^2$$

-continued subject to:

$$\sum_{j=1}^{J-1} \Delta t_j = RawBatchDuration$$

$$\Delta t^L \le \Delta t_j \le \Delta t^U \ \forall \ j = 1, \ldots, J-1$$

Where $yInt_{k,j}$ is a linearly interpolated value computed using eq. (6):

$$yInt_{k,j} = \begin{cases} interp\left(t_{Raw}, y_{Raw}, \sum_{i=2}^{j-1} \Delta t_i\right) & \forall \ j \ge 2 \\ yRaw_{k,j} & \forall \ j = 1 \end{cases} \quad (6)$$

Where interp( ) is the interpolation function, $y_{Raw}$ is the vector with the original values of the variables of the current batch measured at the corresponding times stored in vector $t_{Raw}$ (i.e., the original raw or sampling times). The duration of the current batch is $RawBatchDuration=t_{Raw}(I)-t_{Raw}(1)$.

Variables $\Delta t_j$ are implicitly defined in DTI formulation as:

$$\Delta t_j = t_{j+1} - t_j \forall j = 1, \ldots, J-1 \quad (7)$$

Variables $\Delta(\Delta t_j)$ are defined as:

$$\Delta(\Delta t_j) = \Delta t_{j+1} - \Delta t_j \forall j = 1, \ldots, J-2 \quad (8)$$

Variables $\Delta yRef_{k,j}$ and $\Delta yInt_{k,j}$ are computed using the same approach as in eq. (3) and eq. (4).

Same restrictions apply for the variable weightings as in DTW: $w_k \ge 0 \ \forall k$, and $\Sigma_{k=1}^{K} w_k = 1$. The rest of the parameters are defined as $\Delta t^L = \frac{1}{4}\Delta t_{nominal}$, $\Delta t^U = \frac{1}{3} RawBatchDuration$, and $$\Delta t_{nominal} = \frac{RawBatchDuration}{J-1}.$$

The optimal values of $\Delta t_j$ variables are converted into alignment times using eq. (9) and stored in vector $t_{Align}$.

$$t_j = \begin{cases} t_{Raw}(1) & \forall \ j = 1 \\ t_{Raw}(1) + \sum_{i=1}^{j-1} \Delta t_i & \forall \ j \ge 2 \end{cases} \quad (9)$$

DTI solution depends on the selected variable weightings ($w_k$).

Version of DTI Used in the Example Embodiments

Instead of aligning the entire trajectory of the current batch, the last portion is considered. This is referred as an alignment time window. The reasons to do this are:

51) To avoid realigning data points far from the current time (thus reducing variations in the monitoring statistics), and,
52) To reduce the size of the DTI problem (and thus speedup its solution).

The size of the alignment window is denoted by ω. Note that ω is given in terms of number of data points of the raw batch. Under certain conditions, the size of the alignment window can be greater than the one specified by the user.

The reference batch must be reduced to account for the moving alignment window and the DTW batch maturity bounds. Thus, subscript j goes from ρ to P, instead of 1 to J. The starting point of the reference batch is ρ, while the last point of the reference batch is P.

Adapted DTI Formulation for Alignment Window

The DTI formulation is basically the same for the online batch alignment method (subscripts were modified to show that the problem is constructed for the current alignment window). However, there are additional constraints introducing key alignment times. numberKeyAlignmentTimes indicates the number of key alignment times within the current window. $keyTime_n$ represents the nth key alignment time, while $keyTime_n^\omega$ represents the nth key alignment time adjusted for the current window ω, i.e., $keyTime_n^\omega = keyTime_n - startTime^\omega$. The start time of the window is defined as $startTime^\omega = t_{Align}(\rho)$, i.e., the time of the raw batch point aligned to reference batch point ρ. $N_n$ is the number of $\Delta t_j$ variables that must sum $keyTime_n^\omega$. See Section "Dynamic time interpolation (DTI)", subsection "Key alignment times", for more information about key alignment times.

$$\min_{\Delta t_j} D = \frac{\alpha}{(P-\rho+1)} \sum_{k=1}^{K} \sum_{j=\rho}^{P} w_k (yRef_{k,j} - yInt_{k,j})^2 +$$

$$\frac{(1-\alpha)}{(P-\rho+1)} \sum_{k=1}^{K} \sum_{j=\rho}^{P} w_k (\Delta yRef_{k,j} - \Delta yInt_{k,j})^2 +$$

$$\frac{\beta}{RawBatchDuration_\omega} \sum_{j=\rho}^{P-2} (\Delta(\Delta t_j) - \Delta(\Delta t_{j-1}))^2$$

subject to:

$$\sum_{j=\rho}^{P-1} \Delta t_j = RawBatchDuration_\omega$$

$$\sum_{j=\rho}^{N_n} \Delta t_j = keyTime_n^\omega \ \forall \ n = 1, \ldots, numberKeyAlignmentTimes$$

$$\Delta t^L \le \Delta t_j \le \Delta t^U \ \forall \ j = \rho, \ldots, P-1$$

Note that $yInt_{k,j}$ is computed using eq. (10):

$$yInt_{k,j} = \begin{cases} interp\left(t_{Raw}^\omega, y_{Raw}^\omega, \sum_{i=1}^{j-1} \Delta t_i\right) & \forall \ j \ge 2 \\ yRaw_{k,j} & \forall \ j = 1 \end{cases} \quad (10)$$

where the vectors $y_{Raw}^\omega$ and $t_{Raw}^\omega$ correspond to the adjusted values for the current alignment window. The other parameters are defined as follows: $RawBatchDuration_\omega = t_{Raw}(\tau-) t_{Align}(\rho)$, τ is the current point of the raw batch, $\Delta t^L = \frac{1}{4} \Delta t_{nominal}$, $\Delta t^U = \frac{1}{3} RawBatchDuration_\omega$, and $$\Delta t_{nominal} = \frac{RawBatchDuration_\omega}{P-\rho}.$$

In the current implementation, $t_{Raw}^\omega$ always start from zero.

Vector $t_{Align}$ contains the optimal alignment times for the entire current batch. The elements associated with the current alignment window are updated.

Vector $y_{Align}$ contains the optimal aligned trajectories of the entire current batch. The elements associated with the current alignment window are updated.

Golden Section Search (GSS)

The disclosed method uses GSS combined with DTI algorithm to search the optimal alignment solution. The standard Golden section search algorithm was developed to find the optimum of a univariate unimodal function (Kiefer, J., "Sequential Minimax Search for a Maximum," Proceedings of the American Mathematical Society, 4(3), 502-506 (1953)). It successively narrows the interval where the optimum is known to exist. The GSS steps for a minimization problem are the following:

53) Select tolerance E
54) Compute Golden ratio:

$$GR = \frac{1+\sqrt{5}}{2}$$

55) Initial interval is [a, b]
56) Evaluate the function at points a and b→$fa=f(a)$, $fb=f(b)$
57) Initialize the optimum as $f^*=\min\{fa, fb\}$
58) Set cc=cd=0
59) While |a−b|>ε
   a) If cc=0, compute c=b−(b−a)/GR and $fc=f(c)$
   b) If cd=0, compute d=a+(b−a)/GR and $fd=f(d)$
   c) If $fc<fd$, set b=d, $fb=fd$, d=c, $fd=fc$, cc=0, and cd=1. Otherwise, set a=c, $fa=fc$, c=d, $fc=fd$, cc=1, and cd=0
   d) $f^*=\min\{f^*, fc, fd\}$ GSS for Batch Maturity Estimation GSS needs to be modified for batch maturity estimation. Cumulative distance as a function of the reference batch size (i.e., batch maturity) is not unimodal in some cases. GSS requires to take into account such nonconvexities. Given the solution approach that GSS takes (narrowing the interval where the optimum lies), GSS was selected over other techniques (e.g., Newton's method) because it is easier to detect nonconvexities and explore each subinterval separately. It is also a discrete problem. The objective is to find the point in the reference batch that provides the best alignment (i.e., minimum DTI objective function value) for the current raw batch. For this reason, this is a discrete problem. Also, in this case, function $f(P)$ means to align current raw batch (from θ to τ) against the reference batch given by points ρ to P using DTI. Note that before calling GSS, points θ, τ, and ρ may be known. In some embodiments, an unknown is P. Therefore, P needs to be an integer number.

The modified GSS algorithm steps are the following:
60) Select tolerance E
61) Compute Golden ratio:

$$GR = \frac{1+\sqrt{5}}{2}$$

62) a=$BM^L$, b=$BM^U$ ($BM^L$ and $BM^U$ are the reference batch points given by DTW solution)
63) Initial interval=[a, b], initial interval size=iis=|−b|.
64) Evaluate the function at points a and b→$fa=f(a)$, $fb=f(b)$
65) Initialize the optimum as $f^*=\min\{fa, fb\}$ and $x^*=\text{argmin}\{fa, fb\}$
66) Initial interval is $l_1$=[a, b, $fa$, $fb$]
67) Add interval $l_1$ to list of remaining intervals to explore (L)
68) While number of elements in the list L are greater than zero
   a) Pick first interval from list L (i.e., $l_1$)
   b) Retrieve corresponding values for a=$l_1$(1), b=$l_1$(2), $fa=l_1$(3), and $fb=l_1$(4)
   c) Set cc=cd=0
   d) While |a−b|>ε
     i. If cc=0, compute c=round $$\left[b - \frac{b-a}{GR}\right]$$

and $fc=f(c)$
     ii. If cd=0, compute d=round[a+(b−a)/GR] and $fd=f(d)$
     iii. If $fc<fd$,
       1. If $fd>fb$ and |d−b|>ε, then add [d, b, $fd$, $fb$] to list L
       2. Set b=d, $fb=fd$, d=c, $fd=fc$, cc=0, and cd=1.
     iv. Otherwise,
       1. If $fc>fa$ and |c−a|>ε, then add [a, c, $fa$, $fc$] to list L
       2. Set a=c, $fa=fc$, c=d, $fc=fd$, cc=1, and cd=0
     v. $f^*=\min\{f^*, fc, fd\}$, $x^*=\text{argmin}\{f^*, fc, fd\}$
   e) Replace first interval $l_1$ with the next in the list L
69) Batch maturity estimate BME=$x^*$.

Real-Time Batch Data Alignment (Step 204 of FIG. 1G, Starting at Step 202)

FIG. 1G (step 118 of FIG. 1A) is a flowchart of an example method of online batch alignment. FIG. 1G illustrates the workflow and details of the example embodiments to perform batch alignment in real-time on a running batch process, which involves the following steps, after retrieving a new batch data point 204:

Step 1: Determine Current Batch Phase (Step 206 of FIG. 1G)

To determine in which phase the sliding (alignment) window is, one point within the alignment window is evaluated. Such point is on the reference batch time grid. The point (ρ+$x_1$) indicates when the sliding window enters a new phase. If point (ρ+$x_1$) has crossed the current phase boundary, then the sliding window is considered in the next phase.

The current batch phase CurrentPhase is found when the following condition is met (eq. (11) is checked in ascending order starting with ph=1):

$$\text{CurrentPhase}=ph \text{ if } \rho+x_1 < \text{endPhase}_{ph} \forall ph \quad (11)$$

Where the subscript ph indicates the phase, and parameter endPhase$_{ph}$ is the reference batch point where phase ph ends.

Step 2: Select Corresponding Variable Weightings (Step 208 of FIG. 1G)

Retrieve the variable weightings for the current phase.

$$w_j = W_{j,ph} \forall j, ph=\text{CurrentPhase}$$

$$w_{j,DTW1} = \text{Max}_{previousPhase \leq ph \leq CurrentPhase} \{W_{j,ph,DTW1}\} \forall j$$

$$w_{j,DTW2} = \text{Max}_{previousPhase \leq ph \leq CurrentPhase} \{W_{j,ph,DTW2}\} \forall j \text{ if } W_{j,ph} > 0$$

Note that $w_{j,DTW2}$ values are non-zero if and $W_{j,ph}>0$. This is because the second DTW problem does not take into account variables that were already discarded in an specific phase for being too inconsistent or without any relevant warping information.

Step 3: Adjust Variable Weightings for DTW Based on Previous Information (Step 210 of FIG. 1G)

The variable weightings are multiplied by an adjusting factor $adjW_{j,ph}$. These factors are initialized at the beginning of the algorithm equal to 1, but they can be modified during the algorithm run.

$$w_{j,DTW1} = w_{j,DTW1} \, adjW_{j,ph} \, \forall j$$

$$w_{j,DTW2} = w_{j,DTW2} \, adjW_{j,ph} \, \forall j$$

Then normalize variables weightings such that their sum is equal to 1.

Step 4: Batch Maturity Estimation with DTW (Step 212 of FIG. 1G, Also Collectively, Steps 236, 238, 240, and 242 of FIG. 1G)

Batch maturity estimation is carried on by solving a DTW problem with free end point for two different sets of variable weightings. Also, the DTW problems are solved considering the current and previous phase.

Step 4.1: DTW Problem #1
 Uses variable weightings $w_{j,DTW1}$ from automated method or those specified by the user
 It reacts fast to key events in the batch
 The idea is to reduce false alarms Step 4.2: DTW Problem #2
 Uses variable weightings $w_{j,DTW2}$ based on consistency index or, if the consistency index is not available, they are specified as equal to 1 for key variables (and 0 for non-key variables)
 It reacts slowly to key events in the batch
 However, it gives almost equal importance to key variables
 The idea is to avoid slowing the batch artificially with DTW problem #1 solution when the key events do not happen or happen later than usual
  In that case, DTW problem #1 slows down the batch waiting as much as possible for such key event Step 4.3: Evaluating the Two DTW Solutions
 From each DTW problem, the following results are obtained:
  The lower and upper bounds for the user-specified DTW γ parameter: $[BM_1^L, BM_1^U]$, $[BM_2^L, BM_2^U]$
  The lower and upper bounds for the DTW γ parameter equal to 1.03: $[BM_1^{L,\gamma=1.03}, BM_1^{U,\gamma=1.03}]$, $[BM_2^{L,\gamma=1.03}, BM_2^{U,\gamma=1.03}]$ If $BM_2^{L,\gamma=1.03} > (BM_1^{U,\gamma=1.03} + 2\%$ (reference size)), then it is considered that the DTW problem 2 is significantly farther ahead than DTW problem 1. If that happens, the difference is computed (as a percentage):

$$BM^{diff} = 100(BM_2^{L,\gamma=1.03} - BM_1^{U,\gamma=1.03})/\text{reference size}$$

Step 4.4: Identifying Variables Slowing Down the Batch in DTW Problem #1

When DTW2 is considered to be significantly ahead of DTW1 (see Step 4.3), then follow the next steps:

70) Solve a DTW batch maturity estimation problem for each variable j in the phase with rank greater than or equal to 1. Since some embodiments are aligning these variables independently, the variable weighting employed is 1 in each case.

71) Retrieve the DTW optimal solutions, and lower and upper bounds for γ=1.03 ($avgBM_j^L, avgBM_j^U$, $avgBME_j$).

72) Compute the average lower and upper bounds, as well as the average batch maturity estimate ($avgBM^L$, $avgBM^U$, $avgBME$).

73) Compute the average of $avgBM^L$, $avgBM^U$, and $avgBME$ (denoted as $avgBMP$)

74) For each variable, compute the average of $avgBM_j^L$, $avgBM_j^U$, and $avgBME_j$ (denoted as $avgBMP_j$)

75) If $avgBMP_j < avgBMP - 5\%$ reference size, then identify variable j as lagging behind.

76) If variable j is lagging behind, then it is specified as a candidate to reduce its variable weighting.

77) For those variables from step 7, identify the variable with the lowest rank and with $adjW_{j,ph} > 0.00001$. Pick that variable and set $adjW_{j,ph} = adjW_{j,ph+1} = 0.00001$. Continue to next step.

78) If any $adjW_{j,ph}$ was modified, then use maturity bounds from DTW2 and update flag to indicate that variable weightings have been adjusted.

Step 5: Adjusting Variable Weightings for DTI Based on New Information (Step 214 of FIG. 1G)

The variable weightings for DTI problem are adjusted again since the adjusting factors might be different (depending on results from Step 4.4):

$$w_j = w_j \, adjW_{j,ph} \, \forall j$$

Then normalize variables weightings such that their sum is equal to 1.

Step 6: Adjusting DTW Batch Maturity Bounds (Step 216 of FIG. 1G)

This adjustment is made when
 1. The batch maturity increase is more than 20%
  a. The average of the new bounds is placed at 20% ahead of the current batch maturity estimate.
  b. Set flag $increaseSizeWindow_{DTW}$ equal to 1.
 2. The maturity lower bound $BM^L$ is behind the phase lower bound $BM^{PHL}$, as long as the phase lower bound is smaller than the maturity upper bound $BM^U$.
  a. The new lower bound $BM^L$ is $BM^{PHL}+3$ Step 7: Determine Starting Point of Sliding Window (Step 218 of FIG. 1G)

If $\tau \leq \omega$, then $\theta = \rho = 1$. This is the case at the beginning of the algorithm when the sliding window has not reached the user-specified size ω.

The starting point of the window when $\tau > \omega$ is the aligned point before $\tau - \omega$.

Step 8: Prediction Step (Try to Keep Previous Batch Maturity Estimate as Lower Bound) (Step 220 of FIG. 1G)

If a simple linear extrapolation using the slope of the previous two points can yield a predicted value within 10% of the observed value, then no new relevant information (from the alignment perspective) is added. If that is the case, it is possible to assume the previous batch maturity estimate as the maturity lower bound.

Eq. (13) is used to compute the predicted values of the variables at the latest point in the batch. Eq. (14) computes the weighted relative error of the prediction.

$$yPred_{k,\tau} = \frac{(yObs_{k,\tau-1} - yObs_{k,\tau-2})}{\Delta t_{sample}} \Delta t_{sample} + yObs_{k,\tau-1} = \quad (13)$$

$$2yObs_{k,\tau-1} - yObs_{k,\tau-2} \; \forall k$$

$$WeightedRelativePredictionError_\tau = \sum\nolimits_{k=1}^{K} w_k \left| \frac{yObs_{k,\tau} - yPred_{k,\tau}}{yObs_{k,\tau}} \right| \quad (14)$$

If WeightedRelativePredictionError$_\tau$<0.1, then the previous batch maturity (BM$_{\tau-1}$) can override the current DTW lower bound BM$_\tau^L$ as long as BM$_\tau^L$<BM$_{\tau-1}$≤BM$_\tau^U$, where BM$_\tau^U$ is the current DTW upper bound. Note that BM$_\tau^L$, BM$_\tau^U$, and BM$_{\tau-1}$ are expressed in terms of data points of the reference batch.

Step 9: Determine if the Size of the Sliding Window May be Increased (Step 222 of FIG. 1G)

It is usually necessary to re-align previous portion of the batch when:

- The lower bound from DTW is very close to the beginning of the alignment window
- The lower bound from DTW is before the beginning of the alignment window
- There exists the potential of a drastic increase in the batch maturity estimate (flag increaseSizeWindow$_{DTW}$ computed in Step 6 is equal to 1)
- The alignment window is increased up to 30 points.

Step 10: Identifying Key Alignment Times (Step 224 of FIG. 1G)

Compute the backward differences for the points of the current batch within the alignment window for those variables with rank greater than or equal to 3. The reason to look at variables ranked 3 and higher is because lower ranked variables have much smaller weightings, so sharp deviations may not be as highly penalized. Also, note that rank is used here, not current weighting during alignment method (since those can be updated in Steps 3 and 5).

Finally, count the number of key alignment times within the current window. This is parameter numb erKeyAlignmentTimes.

Step 11: Determine if the Size of the Sliding Window May be Increased (Step 226 of FIG. 1G)

The size of the window may be increased when the number of key alignment times is greater than the minimum possible size of the reference batch, i.e., when:

ρ+numberKeyAlignmentTimes>BM$^L$

If that is the case:

ρ=ρ-6

However, the start of the sliding window cannot be placed before the previous phase boundary to avoid moving back into the previous phase.

Step 12: Put Batch Maturity Bounds in Terms of Current Alignment Window Size and Final Check (step 228 of FIG. 1G)

Note that the bounds BM$^L$ and BM$^U$ refer to points in the reference batch considering the entire trajectory. After saving these values, they are now put in terms of the current size of the reference batch:

BM$^L$=BM$^L$-ρ+1

BM$^U$=BM$^U$-ρ+1

Step 13: Call GSS method (invoke GSS method by step 230, the GSS method being called/applied, collectively, steps 246, 248, 250, 252, 254, 256 of FIG. 1G). After calling the GSS method and storing the best DTI solution 230 the method (and system) 100 may determine 231 whether a batch process is still running. If a batch process is still running, the method (and system) 100 may retrieve 204 a new batch data point and re-iterate, as shown in FIG. 1G. However, if batch process is not still running, the method (and system) 100 may stop 233, as shown in FIG. 1G.

Run the modified Golden Section Search method described in subsection "GSS for batch maturity estimation".

Step 13.1: Postulated Batch Maturity by GSS Method (Step 246 of FIG. 1G)

Follow the steps shown in subsection "GSS for batch maturity estimation".

Step 13.2: Solve DTW Alignment Problem (Step 248 of FIG. 1G)

If there are any key alignment times identified during Step 224 of FIG. 1G-I, solve the corresponding DTW problem.

Step 13.3: Introduce Key Alignment Times into DTW Solution (Step 250 of FIG. 1G)

Replace the times from the DTW solution closer to the key alignment times. First and last times cannot be replaced.

Step 13.4: Determine how Many Delta Time Increments are Required to Sample Each Key Alignment Time (Step 252 of FIG. 1G)

Count the number of time points in the adjusted DTW solution from Step 13.3 that are before each key alignment time keyTime$_n^\omega$. That gives N$_n$ for each keyTime$_n^\omega$.

Step 13.5: Construct Additional Constraints for DTI that Force to Sample Key Alignment Times (Step 254 of FIG. 1G)

The constraints are formulated as:

$$\sum_{j=\rho}^{N_n} \Delta t_j = keyTime_n^\omega \; \forall \; n = 1, \ldots, numberKeyAlignmentTimes$$

Step 13.6: Solve DTI Problem (Step 256 of FIG. 1G)

Solve the corresponding DTI problem. Update best solution if the current one represents an improvement over the best one so far in the GSS method.

Once the final batch maturity BM is calculated, to put it in terms of the entire reference batch, it is updated as BM=BM+ρ-1.

After that, the batch maturity as a percentage is calculated: BM %=100(BM/referenceSize).

Figure 3A:
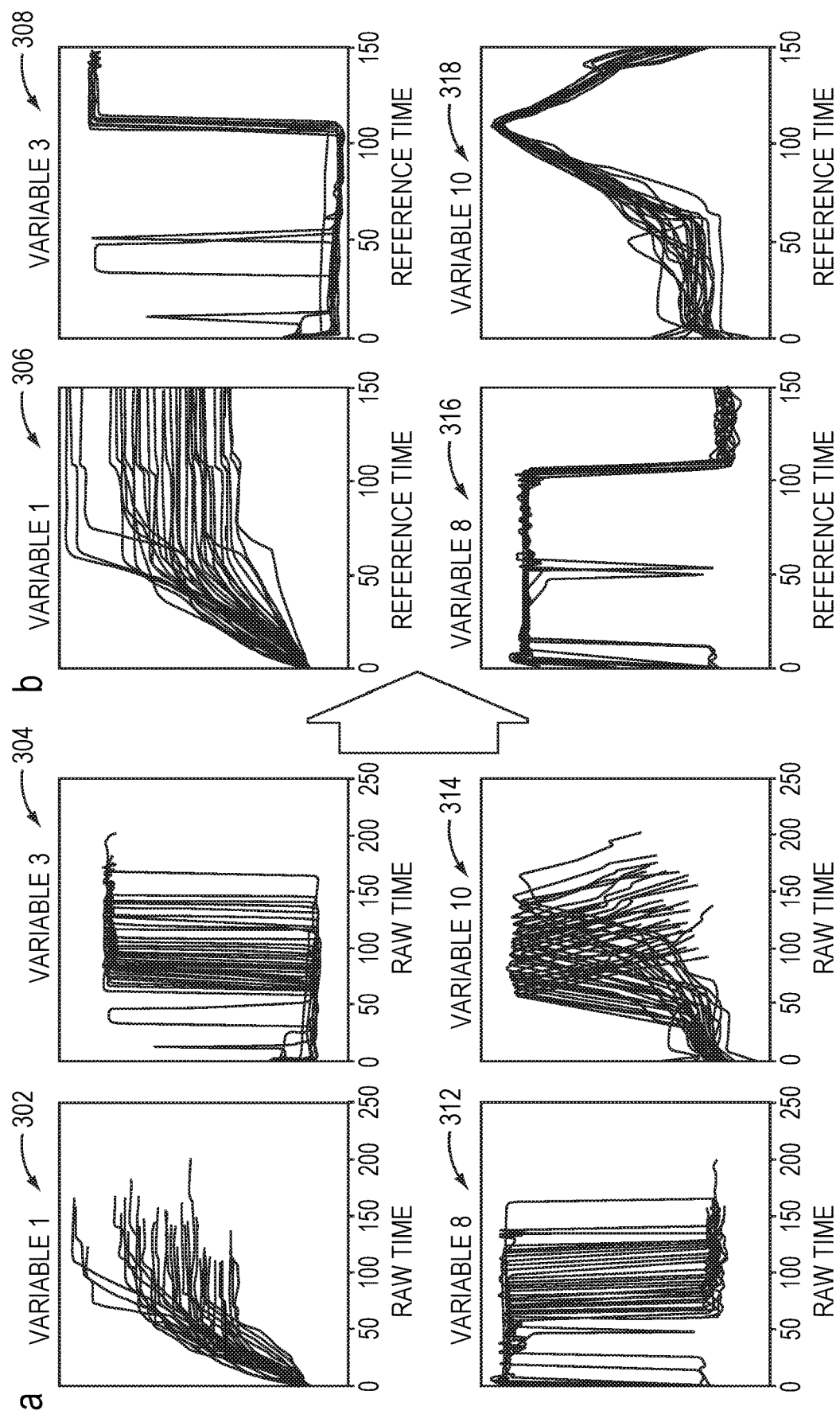
FIG. 3A illustrates an example of batch variable measurements before alignment and after alignment.
Figure 3B:
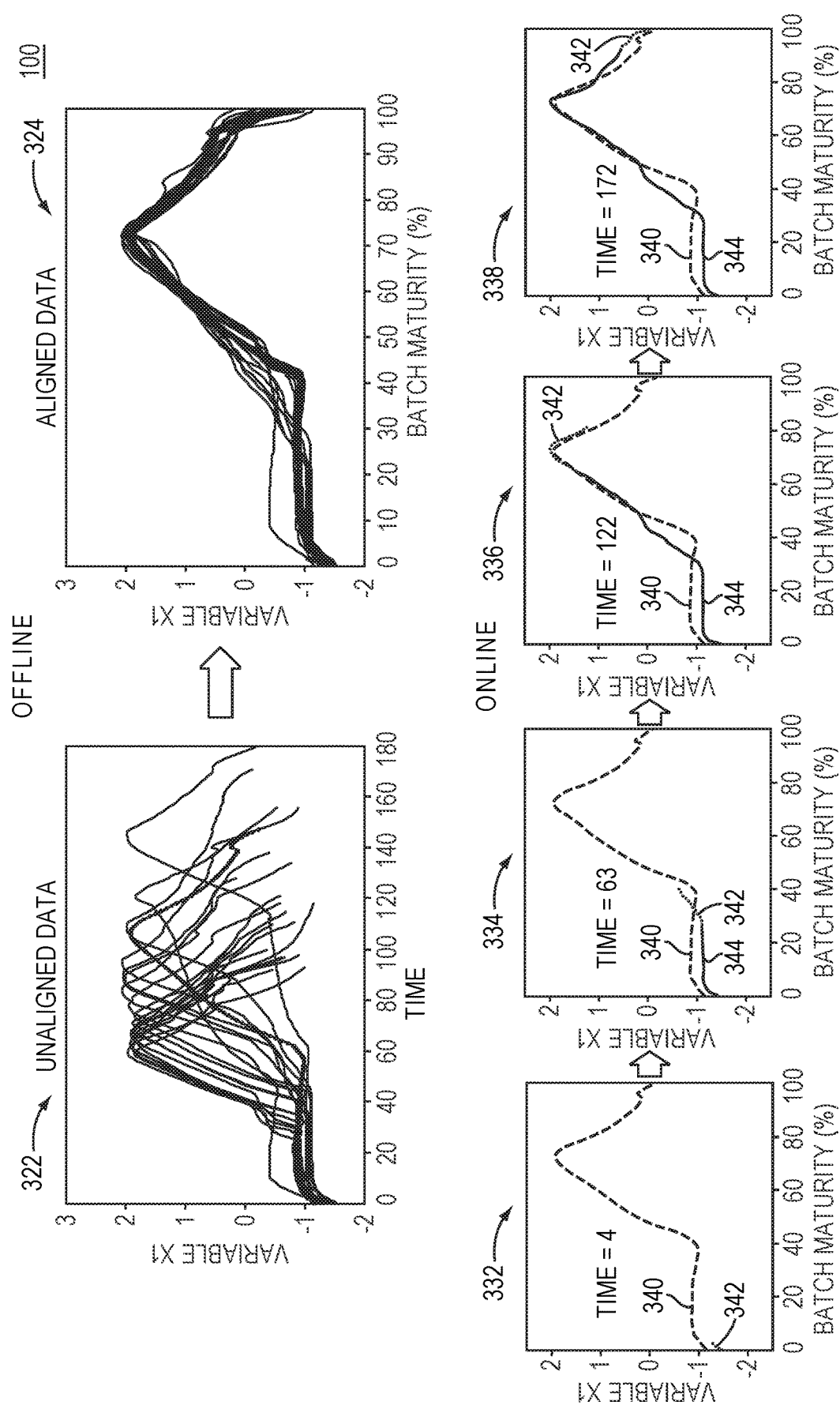
FIG. 3B illustrates an example of the system performing offline and online batch variable alignment.

Referring to FIGS. 3A-B, FIG. 3A illustrates an example of batch variable measurements before alignment and after alignment and FIG. 3B illustrates an example of the system performing offline and online batch variable alignment.

FIG. 3A illustrates an example of batch variable measurements before alignment 302, 304, 312, 314 and after alignment 306, 308, 316, 318.

FIG. 3B illustrates an example of the system performing offline 322, 324 and online 332, 334, 336, 338 batch variable alignment. While offline, complete batch trajectory information is available and final batch maturity may be known (usually 100%). While online, complete batch trajectory is not known and there is a need to estimate batch maturity as the batch progresses.

Also illustrated in FIG. 3B are the reference batch 340, the latest portion 342 of the current batch, and finished alignment 344.

Example Network Environment for Batch Processes

Figure 5:
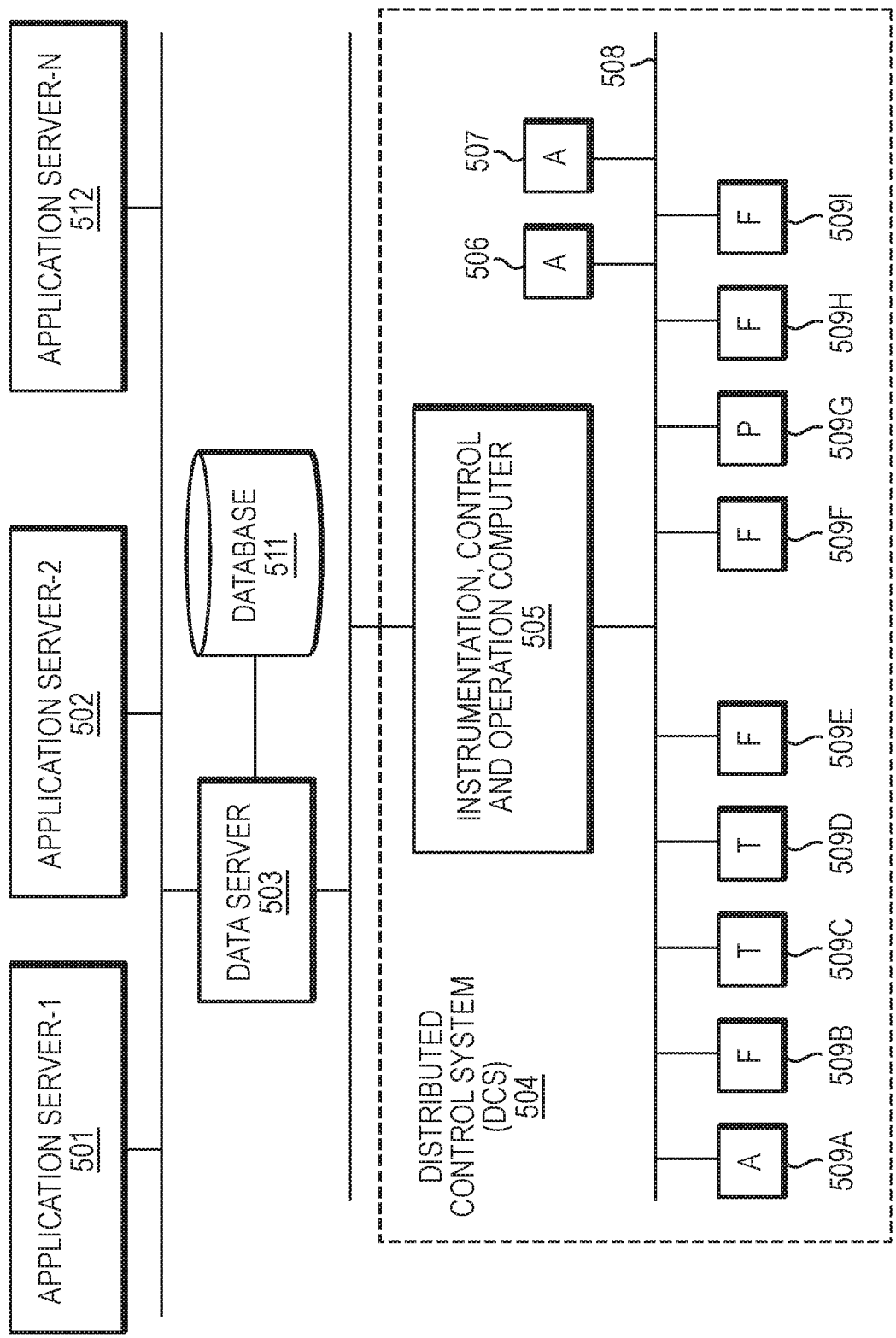
FIG. 5 is a schematic diagram of an example computer network environment in which embodiments of the invention may be implemented.

FIG. 5 illustrates a block diagram depicting an example network environment 500 for monitoring and control of batch processes in some embodiments of the present invention. System computers 501, 502 may operate as a batch alignment executor. In some embodiments of the present invention, each one of the system computers 501, 502 may operate in real-time as batch alignment executor alone, or the computers 501, 502 may operate together as distributed processors contributing to real-time operations as a single batch alignment executor. In other embodiments, additional system computers 512 may also operate as distributed processors contributing to the real-time operation as a batch alignment executor. In some embodiments, system computers 501, 502, 512 operating as the batch alignment executor may be configured with a data loader, batch selector, batch PLS model, a batch monitor, and batch controller.

The system computers 501 and 502 may communicate with the data server 503 to access collected data for measurable process variables from a historian database 511. The data server 503 may be further communicatively coupled to a distributed control system (DCS) 504, or any other plant operation or batch control system, which may be configured with instruments 509A-509I, 506, 507 that collect data at a regular sampling period (e.g., one sample per minute) for the measurable process variables. The instruments may communicate the collected data to an instrumentation computer 505, also configured in the DCS 504, and the instrumentation computer 505 may in turn communicate the collected data to the data server 503 over communications network 508. The data server 503 may then archive the collected data in the historian database 511 for model development and deployment purposes. The batch data collected varies according to the type of target process.

The collected data may include measurements for various measurable batch process variables. These measurements may include a feed stream flow rate as measured by a flow meter 509B, a feed stream temperature as measured by a temperature sensor 509C, component feed concentrations as determined by an analyzer 509A, and reactor cooling temperature in a pipe as measured by a temperature sensor 509D. The collected data may also include measurements for process output stream variables, such as the concentration of produced materials, as measured by analyzers 506 and 507. The collected data may further include measurements for manipulated input variables, such as flow rate as set by valve 509F and determined by flow meter 509H, a cooling water flow rate as set by valve 509E and measured by flow meter 509I, and pressure in a batch reactor as controlled by a valve 509G. The collected data reflect the operation conditions of the representative plant batch process during a particular sampling period.

The collected data is archived in the historian database 511 for batch modeling and control purposes.

The data collected varies according to the type of target process.

In FIG. 5, the system computer 501 and 502 may execute a batch data alignment task for an offline modeling or online deployment purposes. The batch monitoring signals or product quality prediction values generated by the model on the system computer 501 may provide to the instrumentation computer 505 over the network 508 for operator to view, or may be provided to automatically program any other component of the DCS 504, or any other plant or batch control system or processing system coupled to the DCS system 504.

Alternatively, the instrumentation computer 505 can store the historical data 511 through the data server 503 in the historian database 511 and execute the batch offline/online alignment in a stand-alone mode. Collectively, the instrumentation computer 505, the data server 503, and various sensors and output drivers (e.g., 509A-509I, 506, 507) form the DCS 504 and work together to implement and run the presented application.

Some embodiments are illustrated in the example architecture 500 of the computer system. Some embodiments support the process operation of the present invention in a representative plant batch process. In some embodiments, the representative plant may be a special chemical processing plant or a pharmaceutical batch process having a large number of measurable process variables such as temperature, pressure and flow rate variables. It should be understood that in other embodiments the present invention may be used in a wide variety of other types of equipment, or technological processes in the useful arts.

Figure 6:
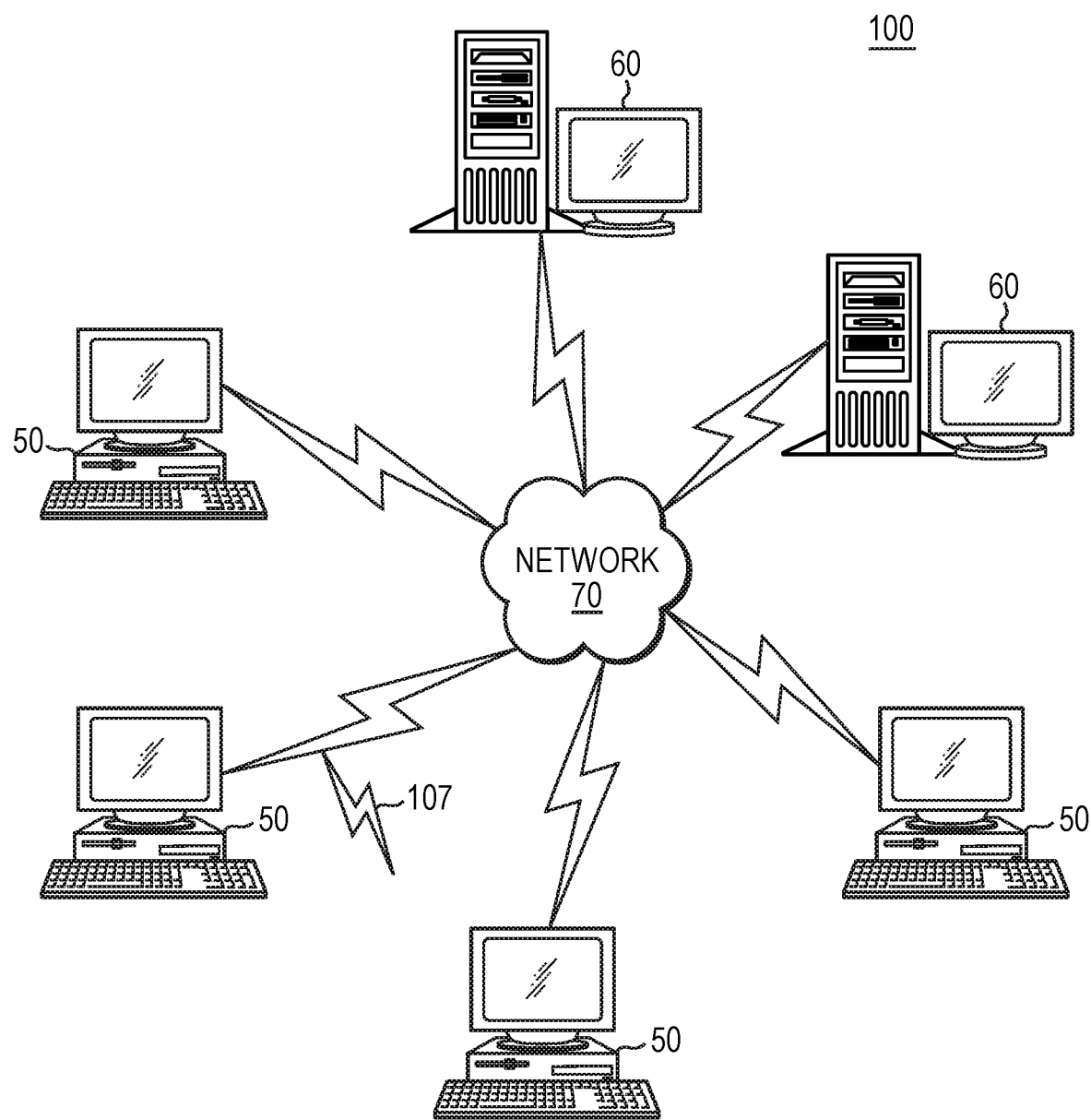
FIG. 6 illustrates a block diagram depicting an example network environment for data collection and monitoring of a batch process in embodiments of the present invention.

FIG. 6 illustrates a computer network or similar digital processing environment in which some embodiments of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 7:
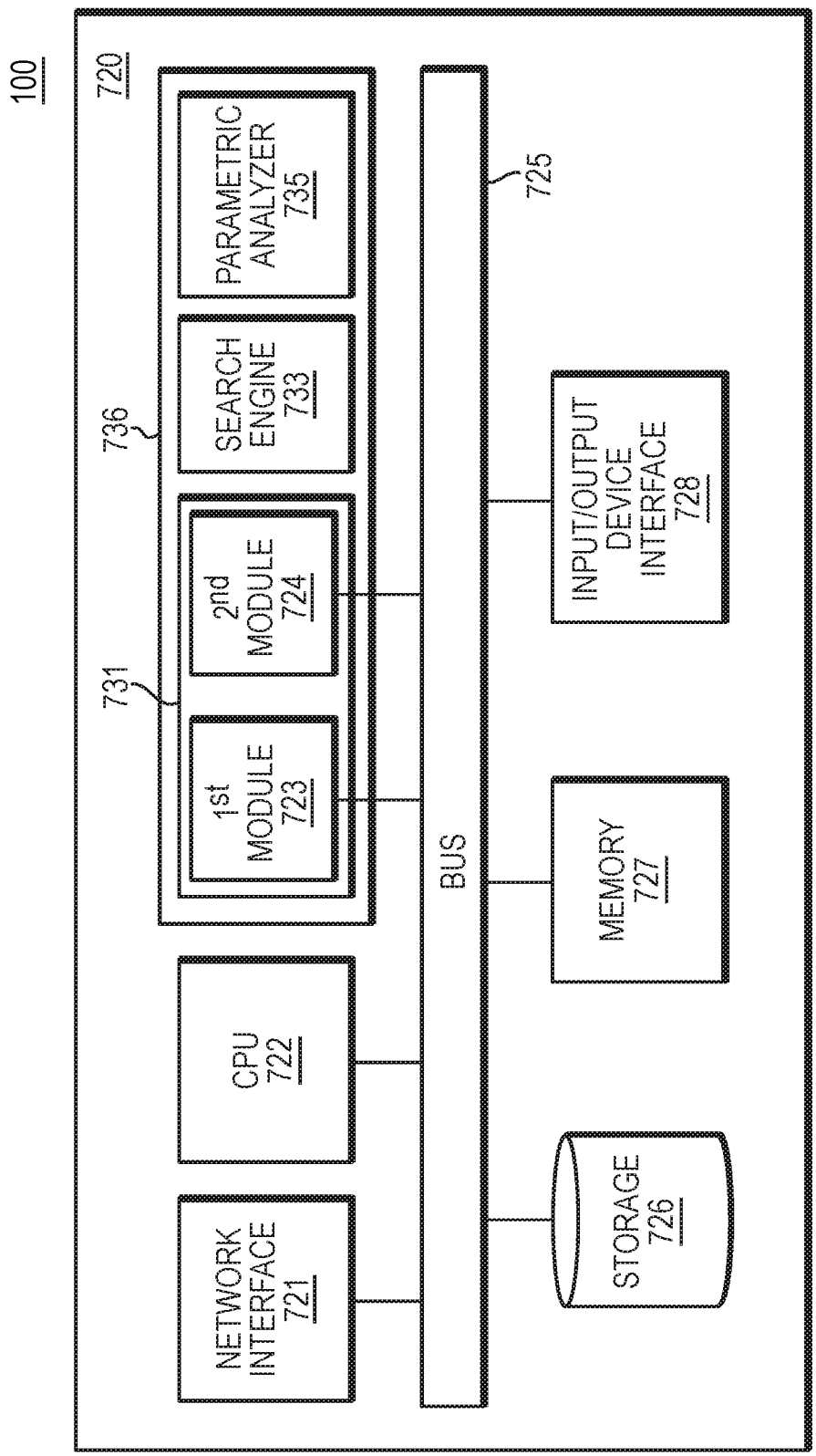
FIG. 7 is a block diagram of a computer (or digital processing) system for developing and deploying a predictive inferential model according to at least one embodiment of the present invention.

FIG. 7 is a diagram of the internal structure of a computer (e.g., client processor/device 50 or server computers 60) in the computer system of FIG. 6. As illustrated in FIG. 7, each computer 50, 60 of FIG. 6 contains system bus 725, where a bus is a set of hardware lines used for data transfer among the components of a computer or processing system. Bus 725 is essentially a shared conduit that connects different elements of a computer system (e.g., processor, disk storage, memory, input/output ports, network ports, etc.) that enables the transfer of information between the elements. Attached to system bus 725 is I/O device interface 728 for connecting various input and output devices (e.g., keyboard, mouse, displays, printers, speakers, etc.) to the computer 50, 60. Network interface 721 allows the computer to connect to various other devices attached to a network (e.g., network 70 of FIG. 5). Memory 727 provides volatile storage for computer software instructions and data used to implement an embodiment of the present invention (e.g., batch alignment executor and controller code and user interface detailed above). Disk storage 726 provides non-volatile storage for computer software instructions and data used to implement an embodiment of the present invention. Central processor unit 722 is also attached to system bus 725 and provides for the execution of computer instructions.

In one embodiment, the processor routines and data are a computer program product (generally referenced as controller 731), including a computer readable medium (e.g., a removable storage medium such as one or more DVD-ROM's, CD-ROM's, diskettes, tapes, etc.) that provides at least a portion of the software instructions for the invention system. Computer program product 731 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 731.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 731 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 731 may be implemented as a so-called Software as a Service (SaaS), or other installation or communication supporting end-users.

Digital Processing Environment

More specifically, FIG. 7 is a block diagram of a computer-based system 720 for performing batch data alignment in modeling, monitoring and control of industrial batch processes according to some embodiments of the present invention detailed above. A central processing unit (CPU) 722 is connected to the bus 725 and provides for the execution of computer instructions embodying the above detailed batch alignment (in offline modeling and for online deployment) stored in Memory 727 and/or Storage 726. In particular, memory 727 and/or storage 726 are configured with program instructions implementing methods of FIGS. 1A-1C, 1G and 4 user interface for aligning batch data for modeling, monitoring and control of an industrial batch process. The system 720 also comprises a network interface 721 for connecting to any variety of networks known in the art, including cloud, wide area networks (WANs) and local area networks (LANs).

Further connected to the bus 725 is a batch alignment executor module 723. The batch alignment executor module 723 performs batch data alignment for offline modeling and online deployment as detailed above in FIGS. 1A-1C, 1G and 4. The batch alignment executor module 723 may calibrate the plant process model by any means known in the art. For example, the batch alignment executor module 723 may reference training data that is stored on the storage device 726 or memory 727, such as a historian database, for calibrating the model 268, 302. For further example, the batch alignment executor module 723 may receive input data from any point communicatively coupled to the system 720 via the network interface 721 and/or input/output device interface 728.

The system 720 further comprises a secondary module 724 that is communicatively/operatively coupled to the batch alignment executor module 723. The secondary module 724 is configured to generate batch monitoring signals (i.e. batch variable measurements) or product quality prediction values generated by the plant process model as described above in FIGS. 1A-1C. The secondary module 724 may make variable measurements and product quality predictions through any means known in the art. For example, the secondary module 724 may access historical data, such as in an array, on the storage device 726 or memory 727. For another example, the secondary module 724 may process input data using the CPU 722 via the bus 725. For further example, the module 724 may retrieve input data from any point of industrial process or the plant communicatively coupled to the system 720 via the network interface 721 and/or input/output device interface 728.

The system 720 further comprises a search engine 733 and parametric analyzer 735 as part of a plant system analysis module 736 that is communicatively/operatively coupled to the batch alignment executor module 723 and secondary module 724. The batch alignment executor module 723 and secondary module 724 from controller 731, of the plant system analysis 736. Plant system analysis module 736 performs and operates as described for batch processes illustrated in FIGS. 2A-2D and 3A-3B. The search engine 733 and parametric analyzer 735 may access historical data, such as in an array, on the storage device 726 or memory 727. For another example, the search engine 733 and parametric analyzer 735 may process batch data for the secondary module 724 using the CPU 722 via the bus 725. For further example, the search engine 733 and parametric analyzer 735 may retrieve the input data from any point of the plant communicatively coupled to the system 720 via the network interface 721 and/or input/output device interface 728.

It should be understood that the example embodiments described herein may be implemented in many different ways. In some instances, the various methods and machines described herein may each be implemented by a physical, virtual, or hybrid general purpose computer, such as the computer system 720. The computer system 720 may be transformed into the machines that execute the methods described herein, for example, by loading software instructions into either memory 727 or non-volatile storage 726 for execution by the CPU 722. Further, while the batch alignment executor module 723, secondary module 724, search engine module 723, and parametric analyzer module 735 are shown as separate modules, in an example embodiment these modules may be implemented using a variety of configurations, included implemented together as a batch data alignment module for modeling, monitoring and control of a plant.

The system 720 and its various components may be configured to carry out any embodiments of the present invention described herein. For example, the system 720 may be configured to carry out the methods 100 . . . and 600 described hereinabove in relation to FIGS. 1A-1C, 1G and 4. In an example embodiment, the batch alignment executor module 723, secondary module 724, search engine 733, and parametric analyzer 735 may be implemented in software that is stored on the memory 727 and/or storage device 726. In such an example embodiment, the CPU 722 and the memory 727 with computer code instructions stored on the memory 727 and/or storage device 726 implement a batch process controller that models a batch process and calculates quality prediction values.

Figure 8:
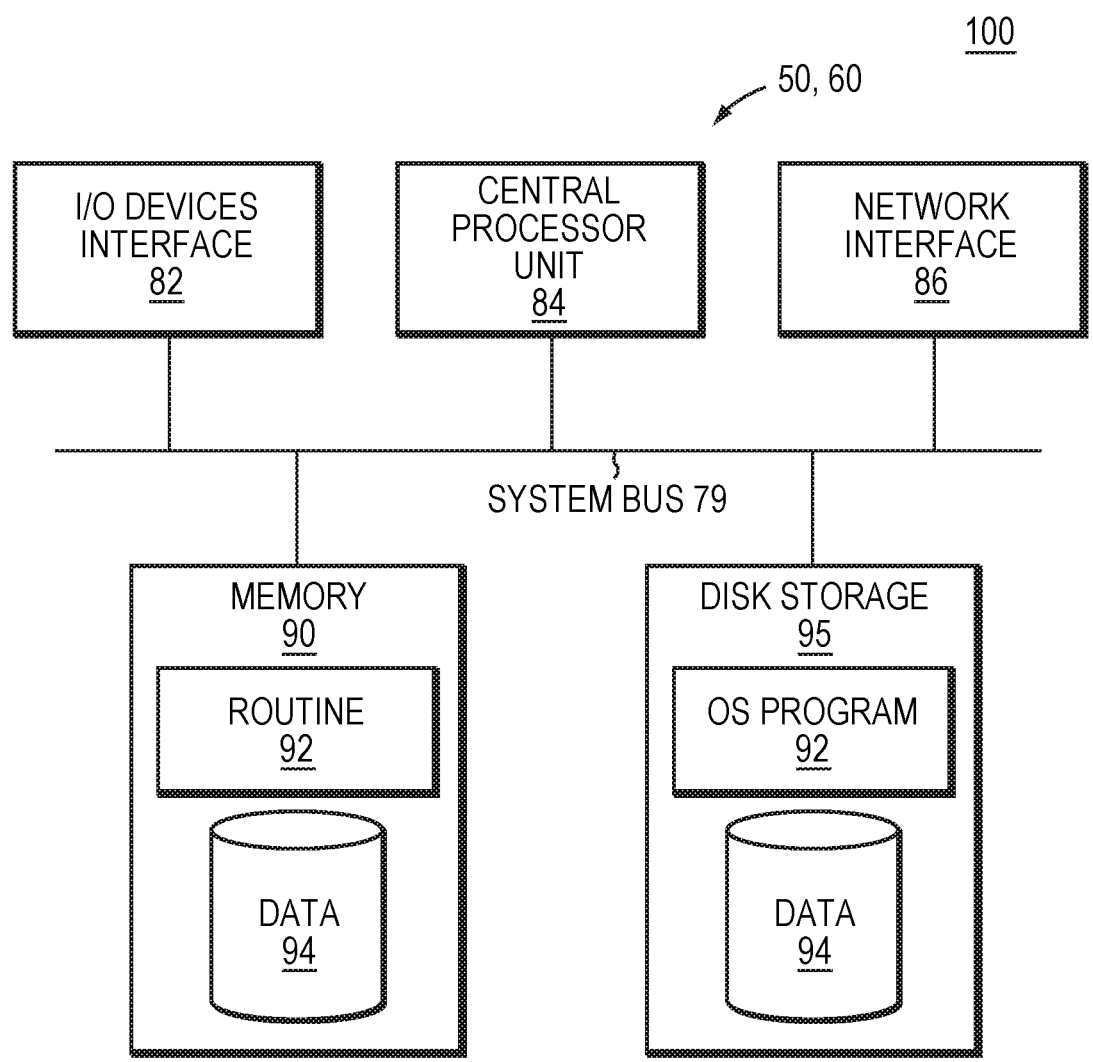
FIG. 8 is block diagram of an example internal structure of a computer for developing and deploying a predictive inferential model according to at least one embodiment of the present invention.

FIG. 8 is another diagram of an example internal structure of a computer (e.g., client processor/device 50 or server computers 60) in the computer system of FIG. 6. Each computer 50, 60 includes a system bus 79, where a bus is a set of hardware lines used for data transfer among the components (e.g., entities) of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, touchscreen etc.) to the computer 50, 60. A network interface 86 allows the computer to connect to various other devices attached to a network (e.g., network 70 of FIG. 6). Memory 90 provides volatile storage for computer software instructions 92 and data 94 used to implement embodiments of the present disclosure (e.g., including but not limited to including any of the system, controller, processor, memory, or any other device, engine, system, module, or controller described herein). Disk storage 95 provides non-volatile storage for computer software instructions 92 and data 94 used to implement some embodiments of the present disclosure. Note, data 94 may be the same between a client 50 and server 60, however, the type of computer software instructions 92 may differ between a client 50 and a server 60. A central processor unit 84 is also attached to the system bus 79 and provides for the execution of computer instructions.

As illustrated in FIG. 8, in an embodiment, the system includes a processor 84 and a memory 90 with computer code instructions stored therein. The memory 90 is operatively coupled to the processor 84 such that the computer code instructions configure the processor 84 to implement a controller.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the disclosure system. Computer program product 92 may be installed by any suitable software installation procedure, as is well known in the art. In another embodiment, at least a portion of the software instructions may also be downloaded over a cable, communication or wireless connection. In other embodiments, the disclosure programs are a computer program propagated signal product 107 (shown in FIG. 6) embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present disclosure routines/program 92.

Embodiments or aspects thereof may be implemented in the form of hardware (including but not limited to hardware circuitry), firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, or some combination thereof, and, thus, the data processors described herein are intended for purposes of illustration and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims.

Some embodiments may provide one or more technical advantages that may transform the behavior or data, provide functional improvements, or solve a technical problem. In some embodiments, technical advantages or functional improvements may include but are not limited to improvement of efficiency, accuracy, speed or other effects compared to the existing methods. Some embodiments provide technical advantages or functional improvements in that they overcome functional deficiencies of existing methods. Some embodiments include technical advantages that include but are not limited to performance improvement or scalability compared with existing approaches.

According to some embodiments, other technical advantages or functional improvements may include but are not limited to the following. Some embodiments may provide a technical advantage or functional improvement by improving the performance and efficiency of one or more of the following, and some embodiments solve a technical problem, thereby providing a technical effect, by one or more of the following:

A systematic method for online batch alignment in industrial implementation is lacking in the existing approaches; this disclosure describes a method (and system) 100 for performing the batch data alignment with an automated workflow for both offline and online batch modeling, monitoring and control;

A system-automated historical batch data loading, screenings and excluding outlier batches and flat trajectory variables, and ability to identify valid batches and rank key batch variables; these methods are lacking in existing approaches.

Some existing approaches (see González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5):462-475 (October 2014); Ramaker, H. J., van Sprang, E. N., Westerhuis, J. A., & Smilde, A. K., "Dynamic time warping of spectroscopic BATCH data," Analytica Chimica Acta, 498(1), 133-153 (August 2003); Zhang, Y., & Edgar, T. F., "A Robust Dynamic Time Warping Algorithm for Batch Trajectory Synchronization," American Control Conference, pp. 2864-2869 (June 2008)) used a so called Dynamic Time Warping (DTW) algorithm to perform the batch data alignment, however, DTW can introduce significant distortions in the aligned data (e.g., some stair-step behavior not present in the original raw data may be introduced) and it can also skip over abnormalities in the trajectory data due to its discrete-time nature (Zhang, Y., & Edgar, T. F., "A Robust Dynamic Time Warping Algorithm for Batch Trajectory Synchronization," American Control Conference, pp. 2864-2869 (June 2008)). In this disclosure, an alternative algorithm, so-called dynamic time interpolation (DTI), is defined and works together with the DTW algorithm to address this issue.

For online batch monitoring and control applications, when doing the alignment online, the measured batch trajectory is not complete. Thus, it is necessary to first determine the current batch maturity and then perform the alignment accordingly. Existing approaches used DTW with relaxed (free) endpoint (González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González-Martínez, J. M., De Noord, O., & Ferrer, A. "Multi-synchro: a novel approach for batch synchronization in scenarios of multiple asynchronisms," Journal of Chemometrics, 28(5):462-475 (October 2014)) to determine batch maturity, which may introduce significant distortions. The disclosed system employs DTI with a modified Golden Section Search (GSS), to address this problem.

This disclosure presents an innovative algorithm that resolves the online alignment for the need of industrial practices: it introduces and employs a moving alignment window, which significantly reduces the size of the optimization problem to be solved, and therefore facilitates the online performance at each sampling interval. The new algorithm uses DTW to compute tight batch maturity bounds and reduces the search space for the GSS method. By combing DTI with GSS and DTW together, a satisfied solution for online batch alignment is obtained.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for performing automated batch data alignment for modeling, monitoring, and controlling an industrial batch process, the method comprising:
    loading batch data from a plant historian database for a subject industrial batch process;
    scaling the loaded batch data for batch alignment;
    screening and removing outliers of batch data from the scaled batch data;
    selecting a reference batch as basis of the batch alignment from the screened batch data;
    defining and adding or modifying one or more batch phases associated with the screened batch data for the batch alignment;
    selecting one or more batch variables associated with the screened batch data based on at least one of: (i) one or more profiles of the one or more batch variables and (ii) one or more curvatures of the one or more batch variables;
    estimating one or more variable weightings based upon the selected batch variables associated with the batch alignment;
    selecting a given batch of the screened batch data to perform the batch alignment against the reference batch;
    adjusting one or more tuning parameters associated with the batch alignment; and
    performing the batch alignment in at least one of an offline mode and an online mode, wherein performing the batch alignment includes performing alignment for a sliding window associated with the subject industrial batch process based upon a continuous objective function that includes a linearly interpolated value solved using dynamic time interpolation (DTI).

2. The method of claim 1, wherein the screening and removing the outliers of the batch data comprises one or more of the steps of:
    a) further screening measurements of the selected batch variables for irregular behaviors as compared to behaviors associated with other batches of the screened batch data;
    b) repairing data of the screened batch data associated with the irregular behaviors;
    c) removing one or more invalid batches from the screened batch data after the data repair including batches that include different variation profiles as compared to the other batches over a time interval;
    d) resampling the selected batch variables with a base sampling rate; and
    e) exporting the selected given batch.

3. The method of claim 1, wherein the selecting the reference batch comprises one or more of the steps of:
    a) further selecting a plurality of reference batches from the screened batch data, and for the plurality of further selected reference batches, calculating quantitative statistical measures for each batch of the plurality as compared with average values of the plurality;
    b) displaying one or more of the plurality of further selected reference batches together to a user with variable profiles in a given view, along with a timeline that represents progression in time of each batch of the plurality
    c) enabling user to select a subset of batches of the screened batch data for the batch alignment based on the given view and domain knowledge of the user; and
    d) enabling the user to discard at least one of the selected batch variables to join the batch alignment.

4. The method of claim 1, wherein the selecting the one or more batch variables comprises one or more of the steps of:
    a) discarding at least one of the one or more batch variables having flat trajectories or trajectories inconsistent with each other;
    b) selecting a subset of batches from the one or more batch variables;
    c) grouping correlated variables of the one or more batch variables;

d) identifying trajectory shapes of the one or more batch variables for a given phase associated with each of the one or more batch variables;
e) calculating a smoothness index for at least one of the one or more batch variables and the given phase;
f) calculating a curvature index for the at least one of the one or more batch variables and the given phase;
g) calculating a consistency index for the at least one of the one or more batch variables and the given phase;
h) determining an alignment score associated with at least one of the one or more batch variables and the given phase;
i) displaying one or more of the following to the user: the discarded batch variables, the selected subset of batches, the grouped correlated variables, the identified trajectory shapes, the calculated smoothness index, the calculated curvature index, the calculated consistency index, the determined alignment score; and
j) providing the user with one or more suggestions to further select any of the at least one of the one or more batch variables and the given phase.

5. The method of claim 1, wherein the estimating the one or more weightings comprises one or more of the steps of:
a) pre-calculating weighting coefficients of one or more default variables of the selected batch variables according to a trajectory shape associated with the one or more default variables;
b) adjusting at least one of the one or more weightings based on a rank and standard deviation of at least one of the selected batch variables;
c) multiplying the one or more weightings with a corresponding consistency index; and
d) further adjusting the one or more weightings in an iterative manner.

6. The method of claim 1, wherein the performing the batch alignment in the online mode further comprises one or more of the steps of:
a) determining a phase of a current batch of the subject industrial batch process for alignment;
b) selecting the one or more estimated variable weightings associated with the current batch phase;
c) adjusting the one or more estimated variable weightings associated with dynamic time warping (DTW) based on information from a previous sequential alignment point of the subject industrial batch process;
d) estimating a current batch maturity of the subject industrial batch process based on the dynamic time warping (DTW);
e) adjusting the one or more estimated variable weightings based on the current batch maturity estimation from the dynamic time warping (DTW);
f) adjusting one or more the dynamic time warping (DTW) batch maturity bounds based on the current batch maturity estimation;
g) modifying a starting point of the sliding window associated with the subject industrial batch process;
h) calculating a prediction and detecting a change in trajectory shapes of the selected batch variables;
i) increasing a size of the sliding window based upon a proximity of a lower bound of the dynamic time warping (DTW) solution to a starting point of the sliding window;
j) identifying one or more alignment times;
k) checking the size of the sliding window for an increase based upon the identified alignment times;
l) further adjusting the one or more batch maturity bounds based on the current alignment window size;
m) performing the alignment of the current batch; and
n) repeating steps (a) to (m) over time for the current batch.

7. The method of claim 6, further comprising one or more of the steps of:
a) defining the batch alignment as a free-end-point problem with a cumulative distance;
b) generating a grid based upon the defined batch alignment, a number of data points of the current batch, and a number of data points of the reference batch; and
c) determining a warping path associated with the generated grid by traversing the generated grid in a monotonic fashion.

8. The method of claim 1, wherein performing the batch alignment includes performing alignment for a sliding window associated with the subject industrial batch is further based upon a modified Golden Section Search (GSS).

9. The method of claim 4, wherein the grouping the correlated variables further comprises one or more of the steps of:
a) building a principal component analysis (PCA) model based on unfolding of the screened batch data; and
b) applying K-means clustering to one or more scores of the principal component analysis (PCA) model.

10. A computer-implemented system for performing automated batch data alignment for modeling, monitoring, and controlling an industrial batch process, the system comprising:
a processor; and
a memory with computer code instructions stored thereon, the memory operatively coupled to the processor such that, when executed by the processor, the computer code instructions cause the computer system to implement:
a modeler engine configured to:
load batch data from a plant historian database for a subject industrial batch process;
scale the loaded batch data for batch alignment;
screen and remove outliers of batch data from the scaled batch data;
select a reference batch as basis of the batch alignment from the screened batch data;
define and add or modify one or more batch phases associated with the screened batch data for the batch alignment;
select one or more batch variables associated with the screened batch data based on at least one of: (i) one or more profiles of the one or more batch variables and (ii) one or more curvatures of the one or more batch variables;
estimate one or more variable weightings based upon the selected batch variables associated with the batch alignment;
select a given batch of the screened batch data to perform the batch alignment against the reference batch;
adjust one or more tuning parameters associated with the batch alignment; and
perform the batch alignment in at least one of an offline mode and an online mode, wherein performing the batch alignment includes performing alignment for a sliding window associated with the subject industrial batch process based upon a continuous objective function that includes a linearly interpolated value solved using dynamic time interpolation (DTI).

11. The system of claim 10, the modeler engine being further configured to screen and remove the outliers of the batch data including at least one of:

a) further screening measurements of the selected batch variables for irregular behaviors as compared to behaviors associated with other batches of the screened batch data;
b) repairing data of the screened batch data associated with the irregular behaviors;
c) removing one or more invalid batches from the screened batch data after the data repair including batches that include different variation profiles as compared to the other batches over a time interval;
d) resampling the selected batch variables with a base sampling rate; and
e) exporting the selected given batch.

12. The system of claim 10, the modeler engine being further configured to select the reference batch including one or more of:
a) further selecting a plurality of reference batches from the screened batch data, and for the plurality of further selected reference batches, calculating quantitative statistical measures for each batch of the plurality as compared with average values of the plurality;
b) displaying one or more of the plurality of further selected reference batches together to a user with variable profiles in a given view, along with a timeline that represents progression in time of each batch of the plurality
c) enabling user to select a subset of batches of the screened batch data for the batch alignment based on the given view and domain knowledge of the user; and
d) enabling the user to discard at least one of the selected batch variables to join the batch alignment.

13. The system of claim 10, the modeler engine further configured to select the one or more batch variables including one or more of:
a) discarding at least one of the one or more batch variables having flat trajectories or trajectories inconsistent with each other;
b) selecting a subset of batches from the one or more batch variables;
c) grouping correlated variables of the one or more batch variables;
d) identifying trajectory shapes of the one or more batch variables for a given phase associated with each of the one or more batch variables;
e) calculating a smoothness index for at least one of the one or more batch variables and the given phase;
f) calculating a curvature index for the at least one of the one or more batch variables and the given phase;
g) calculating a consistency index for the at least one of the one or more batch variables and the given phase;
h) determining an alignment score associated with at least one of the one or more batch variables and the given phase;
i) displaying one or more of the following to the user: the discarded batch variables, the selected subset of batches, the grouped correlated variables, the identified trajectory shapes, the calculated smoothness index, the calculated curvature index, the calculated consistency index, the determined alignment score; and
j) providing the user with one or more suggestions to further select any of the at least one of the one or more batch variables and the given phase.

14. The system of claim 10, the modeler engine further configured to estimate the one or more weightings including one or more of:
a) pre-calculating weighting coefficients of one or more default variables of the selected batch variables according to a trajectory shape associated with the one or more default variables;
b) adjusting at least one of the one or more weightings based on a rank and standard deviation of at least one of the selected batch variables;
c) multiplying the one or more weightings with a corresponding consistency index; and
d) further adjusting the one or more weightings in an iterative manner.

15. The system of claim 10, the modeler engine further configured to perform the batch alignment in the online mode including at least one of:
a) determining a phase of a current batch of the subject industrial batch process for alignment;
b) selecting the one or more estimated variable weightings associated with the current batch phase;
c) adjusting the one or more estimated variable weightings associated with dynamic time warping (DTW) based on information from a previous sequential alignment point of the subject industrial batch process;
d) estimating a current batch maturity of the subject industrial batch process based on the dynamic time warping (DTW);
e) adjusting the one or more estimated variable weightings based on the current batch maturity estimation from the dynamic time warping (DTW);
f) adjusting one or more the dynamic time warping (DTW) batch maturity bounds based on the current batch maturity estimation;
g) modifying a starting point of the sliding window associated with the subject industrial batch process;
h) calculating a prediction and detecting a change in trajectory shapes of the selected batch variables;
i) increasing a size of the sliding window based upon a proximity of a lower bound of the dynamic time warping (DTW) solution to a starting point of the sliding window;
j) identifying one or more alignment times;
k) checking the size of the sliding window for an increase based upon the identified alignment times;
l) further adjusting the one or more batch maturity bounds based on the current alignment window size;
m) performing the alignment of the current batch; and
n) repeating steps (a) to (m) over time for the current batch.

16. The system of claim 15, the modeler engine being further configured to perform at least one of:
a) defining the batch alignment as a free-end-point problem with a cumulative distance;
b) generating a grid based upon the defined batch alignment, a number of data points of the current batch, and a number of data points of the reference batch; and
c) determining a warping path associated with the generated grid by traversing the generated grid in a monotonic fashion.

17. The system of claim 10, wherein performing the batch alignment includes performing alignment for a sliding window associated with the subject industrial batch is further based upon a modified Golden Section Search (GSS).

18. The system of claim 13, the modeler engine being further configured to group the correlated variables including at least one of:
a) building a principal component analysis (PCA) model based on unfolding of the screened batch data; and b) applying K-means clustering to one or more scores of the principal component analysis (PCA) model.

19. A computer program product comprising:
a non-transitory computer-readable storage medium having code instructions stored thereon, the storage medium operatively coupled to a processor, such that, when executed by the processor for modeling, monitoring, and controlling an industrial batch process, the computer code instructions cause the processor to:

load batch data from a plant historian database for a subject industrial batch process;

scale the loaded batch data for batch alignment;

screen and remove outliers of batch data from the scaled batch data;

select a reference batch as basis of the batch alignment from the screened batch data;

define and add or modify one or more batch phases associated with the screened batch data for the batch alignment;

select one or more batch variables associated with the screened batch data based on at least one of: (i) one or more profiles of the one or more batch variables and (ii) one or more curvatures of the one or more batch variables;

estimate one or more variable weightings based upon the selected batch variables associated with the batch alignment;

select a given batch of the screened batch data to perform the batch alignment against the reference batch;

adjust one or more tuning parameters associated with the batch alignment; and perform the batch alignment in at least one of an offline mode and an online mode, wherein performing the batch alignment includes performing alignment for a sliding window associated with the subject industrial batch process based upon a continuous objective function that includes a linearly interpolated value solved using dynamic time interpolation (DTI).

\* \* \* \* \*